United States Patent
Haimi-Cohen et al.

(10) Patent No.: US 12,494,224 B2
(45) Date of Patent: *Dec. 9, 2025

(54) ANALYZING SPEECH USING SPEECH-SAMPLE ALIGNMENT AND SEGMENTATION BASED ON ACOUSTIC FEATURES

(71) Applicant: Cordio Medical Ltd., Or Yehuda (IL)

(72) Inventors: Raziel Haimi-Cohen, Springfield, NJ (US); Itai Katsir, Shaar Efraim (IL); Ilan D. Shallom, Gedera (IL)

(73) Assignee: Cordio Medical Ltd., Or-Yehuda (IL)

( * ) Notice: Subject to any disclaimer, the term of this patent is extended or adjusted under 35 U.S.C. 154(b) by 128 days.

This patent is subject to a terminal disclaimer.

(21) Appl. No.: 18/328,738

(22) Filed: Jun. 4, 2023

(65) Prior Publication Data
US 2023/0317099 A1 Oct. 5, 2023

Related U.S. Application Data

(63) Continuation-in-part of application No. 17/233,487, filed on Apr. 18, 2021, now Pat. No. 11,727,954, (Continued)

(51) Int. Cl.
*G10L 15/00* (2013.01)
*G10L 15/22* (2006.01)
(Continued)

(52) U.S. Cl.
CPC .............. *G10L 25/66* (2013.01); *G10L 15/22* (2013.01); *G10L 15/30* (2013.01)

(58) Field of Classification Search
CPC ........ G10L 25/66; G10L 25/63; A61B 5/4803
See application file for complete search history.

(56) References Cited

U.S. PATENT DOCUMENTS

| | | | |
|---|---|---|---|
| 4,292,471 A | 9/1981 | Kuhn et al. | |
| 4,838,275 A | 6/1989 | Lee | |

(Continued)

FOREIGN PATENT DOCUMENTS

| | | | |
|---|---|---|---|
| CN | 102125427 A | 7/2011 | |
| CN | 102423262 A | 4/2012 | |

(Continued)

OTHER PUBLICATIONS

CN Application # 2020800180012 Office Action dated Jan. 30, 2024.

(Continued)

*Primary Examiner* — Daniel Abebe
(74) *Attorney, Agent, or Firm* — Meitar Patents Ltd.; Daniel Kligler

(57) ABSTRACT

A method includes mapping, by a processor, a test speech sample, which was produced by a subject while a physiological state of the subject was unknown, to a reference speech sample, which was produced in a known physiological state. The method further includes, based on the mapping, computing a distance between the test speech sample and the reference speech sample, and in response to the distance, communicating an output indicating the physiological state of the subject while the test speech sample was produced. Other embodiments are also described.

25 Claims, 6 Drawing Sheets

Related U.S. Application Data which is a continuation of application No. 16/299,178, filed on Mar. 12, 2019, now Pat. No. 11,011,188.

(51) Int. Cl.
*G10L 15/30* (2013.01)
*G10L 25/66* (2013.01)

(56) References Cited

U.S. PATENT DOCUMENTS

| | | | |
|---|---|---|---|
| 5,853,005 | A | 12/1998 | Scanlon |
| 5,864,810 | A | 1/1999 | Digalakis et al. |
| 6,006,188 | A * | 12/1999 | Bogdashevsky ........ G10L 17/26 706/50 |
| 6,168,568 | B1 | 1/2001 | Gavriely |
| 6,241,683 | B1 | 6/2001 | Macklem et al. |
| 6,289,313 | B1 | 9/2001 | Heinonen et al. |
| 6,389,393 | B1 | 5/2002 | Gong |
| 6,396,416 | B1 | 5/2002 | Kuusela et al. |
| 6,527,729 | B1 | 3/2003 | Turcott |
| 6,600,949 | B1 | 7/2003 | Turcott |
| 7,092,874 | B2 | 8/2006 | Clavbo |
| 7,225,013 | B2 | 5/2007 | Geva et al. |
| 7,226,422 | B2 | 6/2007 | Hatlestad et al. |
| 7,267,652 | B2 | 9/2007 | Coyle et al. |
| 7,283,962 | B2 | 10/2007 | Meyerhoff et al. |
| 7,363,226 | B2 | 4/2008 | Shiomi et al. |
| 7,398,213 | B1 | 7/2008 | Levanon et al. |
| 7,457,753 | B2 | 11/2008 | Moran et al. |
| 7,529,670 | B1 | 5/2009 | Michaelis |
| 7,762,264 | B1 | 7/2010 | Raming et al. |
| 8,478,596 | B2 | 7/2013 | Schultz |
| 8,591,430 | B2 | 11/2013 | Amurthur et al. |
| 8,684,900 | B2 | 4/2014 | Tran |
| 8,689,606 | B2 | 4/2014 | Schellekens et al. |
| 8,784,311 | B2 | 7/2014 | Shrivastav et al. |
| 8,903,725 | B2 | 12/2014 | Pilz |
| 9,070,357 | B1 * | 6/2015 | Kennedy ................. G10L 15/00 |
| 9,138,167 | B1 | 9/2015 | Leydon |
| 9,153,231 | B1 | 10/2015 | Salvador et al. |
| 9,445,763 | B2 | 9/2016 | Davis et al. |
| 9,492,096 | B2 | 11/2016 | Brockway et al. |
| 9,579,056 | B2 | 2/2017 | Rosenbek et al. |
| 9,685,174 | B2 | 6/2017 | Karam et al. |
| 9,922,641 | B1 | 3/2018 | Chun |
| 10,311,980 | B2 | 6/2019 | Kim et al. |
| 10,796,205 | B2 | 10/2020 | Shi et al. |
| 10,796,805 | B2 | 10/2020 | Lotan et al. |
| 10,847,177 | B2 | 11/2020 | Shallom |
| 10,896,765 | B2 | 1/2021 | Kim et al. |
| 10,991,384 | B2 | 4/2021 | Eyben et al. |
| 11,011,188 | B2 | 5/2021 | Shallom |
| 11,024,327 | B2 | 6/2021 | Shallom |
| 11,417,342 | B2 | 8/2022 | Shallom |
| 11,484,211 | B2 | 11/2022 | Shallom |
| 11,538,490 | B2 | 12/2022 | Shallom |
| 11,610,600 | B2 | 3/2023 | Shallom |
| 12,046,238 | B2 * | 7/2024 | Khaleghi ................. G10L 15/26 |
| 2002/0059029 | A1 | 5/2002 | Todder et al. |
| 2003/0115054 | A1 | 6/2003 | Iso-Sipila |
| 2003/0220790 | A1 | 11/2003 | Kepuska |
| 2004/0097822 | A1 | 5/2004 | Muz et al. |
| 2005/0038635 | A1 | 2/2005 | Klefenz et al. |
| 2005/0060153 | A1 | 3/2005 | Gable et al. |
| 2006/0058697 | A1 | 3/2006 | Mochizuki et al. |
| 2006/0116878 | A1 | 6/2006 | Nagamine |
| 2006/0167385 | A1 | 7/2006 | Guion |
| 2006/0293609 | A1 | 12/2006 | Stahmann et al. |
| 2007/0005357 | A1 | 1/2007 | Moran et al. |
| 2007/0100623 | A1 | 5/2007 | Hentschel et al. |
| 2007/0225975 | A1 | 9/2007 | Imoto |
| 2007/0288183 | A1 | 12/2007 | Bulkes et al. |
| 2008/0013747 | A1 | 1/2008 | Tran |
| 2008/0275349 | A1 | 11/2008 | Halperin et al. |
| 2009/0036777 | A1 | 2/2009 | Zhang et al. |
| 2009/0043586 | A1 | 2/2009 | MacAuslan |
| 2009/0099848 | A1 | 4/2009 | Lerner et al. |
| 2009/0227888 | A1 | 9/2009 | Salmi et al. |
| 2009/0326937 | A1 | 12/2009 | Chitsaz et al. |
| 2010/0201807 | A1 | 8/2010 | Mcpherson |
| 2011/0021940 | A1 | 1/2011 | Chu et al. |
| 2011/0092779 | A1 | 4/2011 | Chang et al. |
| 2011/0125044 | A1 | 5/2011 | Rhee |
| 2011/0184250 | A1 | 7/2011 | Schmidt et al. |
| 2012/0041279 | A1 | 2/2012 | Freeman et al. |
| 2012/0116186 | A1 | 5/2012 | Shrivastav et al. |
| 2012/0220899 | A1 | 8/2012 | Oh et al. |
| 2012/0265024 | A1 | 10/2012 | Shrivastav et al. |
| 2012/0283598 | A1 | 11/2012 | Horii et al. |
| 2013/0018274 | A1 | 1/2013 | O'Neill |
| 2013/0158434 | A1 | 6/2013 | Shen et al. |
| 2013/0166279 | A1 | 6/2013 | Dines et al. |
| 2013/0218582 | A1 | 8/2013 | Lalonde |
| 2014/0005564 | A1 | 1/2014 | Ivanovic et al. |
| 2014/0073993 | A1 | 3/2014 | Poellabauer et al. |
| 2014/0153794 | A1 | 6/2014 | Varaklis et al. |
| 2014/0249424 | A1 | 9/2014 | Fan et al. |
| 2014/0294188 | A1 | 10/2014 | Rini et al. |
| 2014/0302472 | A1 | 10/2014 | Fletcher |
| 2014/0314212 | A1 | 10/2014 | Bentley et al. |
| 2015/0073306 | A1 | 3/2015 | Abeyratne et al. |
| 2015/0126888 | A1 | 5/2015 | Patel et al. |
| 2015/0127350 | A1 | 5/2015 | Agiomyrgiannakis |
| 2015/0216448 | A1 | 8/2015 | Lotan et al. |
| 2015/0265205 | A1 | 9/2015 | Rosenbek et al. |
| 2016/0015289 | A1 | 1/2016 | Simon et al. |
| 2016/0045161 | A1 | 2/2016 | Alshaer et al. |
| 2016/0081611 | A1 | 3/2016 | Hampton et al. |
| 2016/0095545 | A1 | 4/2016 | Levanon |
| 2016/0113618 | A1 | 4/2016 | Su et al. |
| 2016/0249842 | A1 | 9/2016 | Ohana Lubelchick |
| 2016/0302003 | A1 | 10/2016 | Rahman et al. |
| 2017/0069312 | A1 | 3/2017 | Sundararajan et al. |
| 2017/0084295 | A1 | 3/2017 | Tsiartas et al. |
| 2017/0262606 | A1 | 9/2017 | Abdullah et al. |
| 2017/0280239 | A1 | 9/2017 | Sekiya et al. |
| 2017/0325779 | A1 | 11/2017 | Spina et al. |
| 2017/0354363 | A1 | 12/2017 | Quatieri et al. |
| 2018/0004913 | A1 | 1/2018 | Ghasemzadeh et al. |
| 2018/0108440 | A1 | 4/2018 | Stevens et al. |
| 2018/0125444 | A1 | 5/2018 | Kahlman et al. |
| 2018/0214061 | A1 * | 8/2018 | Knoth ..................... G10L 17/26 |
| 2018/0296092 | A1 | 10/2018 | Hassan et al. |
| 2019/0130910 | A1 * | 5/2019 | Kariya ..................... G10L 15/22 |
| 2019/0221317 | A1 | 7/2019 | Kempanna et al. |
| 2019/0311815 | A1 | 10/2019 | Kim et al. |
| 2019/0385711 | A1 | 12/2019 | Shriberg et al. |
| 2020/0077940 | A1 | 3/2020 | Srivastava et al. |
| 2020/0098384 | A1 | 3/2020 | Nematihosseinabadi et al. |
| 2020/0152226 | A1 | 5/2020 | Anushiravani et al. |
| 2020/0168230 | A1 | 5/2020 | Roh et al. |
| 2021/0065676 | A1 | 3/2021 | Abrami et al. |
| 2021/0110894 | A1 | 4/2021 | Shriberg et al. |
| 2021/0193169 | A1 | 6/2021 | Faizakof et al. |
| 2021/0256992 | A1 | 8/2021 | Shallom |
| 2022/0130415 | A1 | 4/2022 | Garrison et al. |
| 2022/0165295 | A1 | 5/2022 | Shallom |
| 2022/0257466 | A1 | 8/2022 | Nitzan |
| 2022/0328064 | A1 | 10/2022 | Shriberg et al. |
| 2022/0409063 | A1 | 12/2022 | Shallom |
| 2022/0415308 | A1 | 12/2022 | Berisha et al. |
| 2023/0072242 | A1 | 3/2023 | Kim et al. |
| 2023/0080870 | A1 | 3/2023 | Shallom |
| 2023/0190177 | A1 | 6/2023 | Shor et al. |
| 2023/0352013 | A1 * | 11/2023 | Khaleghi ................. G10L 15/22 |

FOREIGN PATENT DOCUMENTS

| | | |
|---|---|---|
| CN | 202261466 U | 5/2012 |
| CN | 102497472 A | 6/2012 |
| CN | 107622797 A | 1/2018 |
| DE | 102015218948 A1 | 3/2017 |
| EP | 1091689 A1 | 4/2001 |
| EP | 1855594 A1 | 11/2007 |

(56) References Cited

FOREIGN PATENT DOCUMENTS

| | | |
|---|---|---|
| EP | 2124223 A1 | 11/2009 |
| EP | 2438863 A1 | 4/2012 |
| EP | 3365057 A1 | 8/2018 |
| FR | 2672793 A1 | 8/1992 |
| GB | 1219618 A | 1/1971 |
| GB | 2493458 A | 2/2013 |
| JP | 04082538 A | 3/1992 |
| JP | 09173320 A | 7/1997 |
| JP | 2003044078 A | 2/2003 |
| JP | 2004302786 A | 10/2004 |
| JP | 2006230548 A | 9/2006 |
| JP | 2016006504 A | 1/2016 |
| JP | 2017191166 A | 10/2017 |
| JP | 6263308 B1 | 1/2018 |
| SE | 508439 C2 | 10/1998 |
| WO | 03068062 A1 | 8/2003 |
| WO | 2005074799 A1 | 8/2005 |
| WO | 2006033044 A3 | 3/2006 |
| WO | 2006079062 A1 | 7/2006 |
| WO | 2010004025 A1 | 1/2010 |
| WO | 2010015865 A1 | 2/2010 |
| WO | 2010123483 A2 | 10/2010 |
| WO | 2012038903 A2 | 3/2012 |
| WO | 2012104743 A2 | 8/2012 |
| WO | 2013043847 A1 | 3/2013 |
| WO | 2013170131 A1 | 11/2013 |
| WO | 2014037843 A1 | 3/2014 |
| WO | 2014045257 A1 | 3/2014 |
| WO | 2014188408 A1 | 11/2014 |
| WO | 2016028495 A1 | 2/2016 |
| WO | 2017060828 A1 | 4/2017 |
| WO | 2017068582 A1 | 7/2017 |
| WO | 2017147221 A1 | 8/2017 |
| WO | 2018021920 A1 | 2/2018 |
| WO | 2019089830 A1 | 5/2019 |
| WO | 2019210261 A1 | 10/2019 |

OTHER PUBLICATIONS

IN Application # 202347030550 Office Action dated Dec. 13, 2023.
CN Application # 2019800670875 Office Action dated Dec. 20, 2023.
JP Application # 2021549583 Office Action dated Dec. 25, 2023.
JP Application # 2021551893 Office Action dated Dec. 25, 2023.
CN Application # 202080017839X Office Action dated Jan. 27, 2024.
Hickey., "App lets you monitor lung health using only a smartphone", pp. 1-5, Sep. 18, 2012.
Gandler et al., "Mobile FEV: Evaluation of iPhone Spirometer", pp. 1-1, Feb. 14, 2013.
Abushakra et al., "Lung capacity estimation through acoustic signal of breath", 13th IEEE International Conference on BioInformatics and BioEngineering, pp. 386-391, Nov. 11-Nov. 13, 2012.
G.P. Imports, Inc., "Spirometer Pro", pp. 1-3, Jan. 8, 2010.
Murton et al., "Acoustic speech analysis of patients with decompensated heart failure: A pilot study", The Journal of the Acoustical Society of America, vol. 142, Issue 4, pp. 1-28, Oct. 24, 2017.
Gillespie et al., "The Effects of Hyper- and Hypocapnia on Phonatory Laryngeal Airway Resistance in Women", Research Article, Journal of Speech, Language, and 638 Hearing Research, vol. 58, pp. 638-652, Jun. 2015.
Wang et al., "Accuracy of perceptual and acoustic methods for the detection of inspiratory loci in spontaneous speech", Behavior Research Methods, vol. 44, Issue 4, pp. 1121-1128, Dec. 2012.
Larson et al., "SpiroSmart: using a microphone to measure lung function on a mobile phone", Proceedings of the 2012 ACM Conference on Ubiquitous Computing (UbiComp '12), pp. 280-289, Sep. 5-8, 2012.
Abushakra et al., "An Automated Approach Towards Estimating Lung Capacity from Respiration Sounds", IEEE Healthcare Innovations Conference (HIC'12), pp. 1-5, Jan. 2012.
Williammson et al., "Vocal and Facial Biomarkers of Depression Based on Motor Incoordination and Timing", 4th International Audio/Visual Emotion Challenge and Workshop: Depression Challenge, Orlando, Florida, USA , pp. 1-8, Nov. 7, 2014.
Ciccarelli et al., "Neurophysiological Vocal Source Modeling for Biomarkers of Disease", Interspeech 2016: Understanding Speech Processing in Humans and Machines, Technical Program, San Francisco, USA, pp. 1-7, Sep. 8-12, 2016.
Helfer et al., "Classification of depression state based on articulatory precision", Proceedings of the 14th Annual Conference of the International Speech Communication Association (Interspeech), pp. 2172-2176, year 2013.
Horwitz., "Vocal Modulation Features in the Prediction of Major Depressive Disorder Severity", Master Thesis, Massachusetts Institute of Technology, pp. 1-115, Sep. 2014.
Hillel., "Using phonation time to estimate vital capacity in amyotrophic lateral sclerosis", Arch Phys Med Rehabil, vol. 70, pp. 618-620, Aug. 1989.
Yanagihara., "Phonation and Respiration", Folia Phoniat, vol. 18, pp. 323-340, year 1966.
Dewar et al., "Chronic obstructive pulmonary disease: diagnostic considerations.", American Academy of Family Physicians, vol. 73, pp. 669-676, Feb. 2006.
Solomon et al., "Respiratory and laryngeal contributions to maximum phonation duration", Journal of voice, vol. 14, No. 3, pp. 331-340, Sep. 2000.
Dogan et al., "Subjective and objective evaluation of voice quality in patients with asthma", Journal of voice, vol. 21, No. 2, pp. 224-230, Mar. 2007.
Orenstein et al., "Measuring ease of breathing in young patients with cystic fibrosis", Pediatric Pulmonology, vol. 34, No. 6, pp. 473-477, Aug. 8, 2002.
Lee et al., "Speech Segment Durations Produced by Healthy and Asthmatic Subjects", Journal of Speech and Hearing Disorders, vol. 653, pp. 186-193, May 31, 1988.
JP Application # 2022548568 Office Action dated Oct. 29, 2024.
US Application # 17531828 Office Action dated Jan. 15, 2025.
US Application # 18105848 Office Action dated Jan. 21, 2025.
Rabiner, L., "A tutorial on hidden Markov models and selected applications in speech recognition," Proceedings of the IEEE, vol. 77, issue 2, pp. 257-286, Feb. 1989.
Rabiner et al., "Fundamentals of Speech Recognition", Prentice Hall, pp. 1-18 (related section 6.4.3.), year 1993.
Sakoe et al., "Dynamic Programming Algorithm Optimization for Spoken Word Recognition", IEEE Transactions on Acoustics, Speech and Signal Processing, vol. ASSP-26, No. 1, pp. 43-49, Feb. 1978.
Lee et al., "Consistency of acoustic and aerodynamic measures of voice production over 28 days under various testing conditions", Journal of Voice, vol. 13, issue 4, pp. 477-483, Dec. 1, 1999.
Walia et al., "Level of Asthma: A Numerical Approach based on Voice Profiling", IJEDR(International Journal of Engineering Development and Research), vol. 4, Issue 4, pp. 717-722, year 2016.
Mulligan et al., "Detecting regional lung properties using audio transfer functions of the respiratory system", 31st Annual International Conference of the IEEE EMBS, pp. 5697-5700, Sep. 2-6, 2009.
Christina et al., "HMM-based speech recognition system for the dysarthric speech evaluation of articulatory subsystem", International Conference on Recent Trends in Information Technology, pp. 54-59, Apr. 1, 2012.
Wang et al., "Vocal folds disorder detection using pattern recognition methods", 29th Annual International Conference of the IEEE Engineering in Medicine and Biology Society, pp. 3253-3256, Aug. 22-26, 2007.
Masada et al., "Feature Extraction by ICA and Clustering for Lung Sound Classification", IPSJ Symposium Series, vol. 2007, pp. 1-9, year 2007.
De La Torre et al., "Discriminative feature weighting for HMM-based continuous speech recognizers", Speech Communication, vol. 38, pp. 267-286, year 2001.
Mswanathan et al., "Complexity Measures of Voice Recordings as a Discriminative Tool for Parkinson's Disease", MDPI Journal Biosensors 2020, vol. 10, No. 1, pp. 1-16, Dec. 20, 2019.

(56) References Cited

OTHER PUBLICATIONS

Williamson et al., "Segment-dependent dynamics in predicting Parkinson's disease", ISCA Conference Interspeech 2015, pp. 518-522, Dresden, Germany, Sep. 6-10, 2015.
Valente et al., "Maximum Entropy Discrimination (MED) Feature subset Selection for Speech Recognition", IEEE Workshop on Automatic Speech Recognition and Understanding (ASRU), ResearchGate publication, pp. 327-332, Nov. 30-Dec. 4, 2003.
Ramirez et al., "Voice activity detection. Fundamentals and speech recognition system robustness", Robust Speech Recognition and Understanding, I-Tech, Vienna, Austria, pp. 1-24, Jun. 2007.
Bachu et al., "Separation of Voiced and Unvoiced Speech Signals using Energy and Zero Crossing Rate", ASEE Regional Conference, pp. 1-7, year 2008.
Eden et al., "Measuring phonological distance between languages", Doctor Thesis, UCL Department of Linguistics, pp. 1-254, year 2018.
Falkhausen et al., "Calculation of Distance Measures Between Hidden Markov Models", 4th European Conference on Speech Communication and Technology, pp. 1487-1490, Sep. 18-21, 1995.
Kempton et al., "Cross-language phone recognition when the target language phoneme inventory is not known", 12th Annual Conference of the International Speech Communication Association, pp. 3165-3168, Aug. 27-31, 2011.
Kienappel et al., "Cross-Language Transfer of Multilingual Phoneme Models", ASR2000-Automatic Speech Recognition Challenges for the New Millennium, pp. 1-5, Sep. 18-20, 2000.
Gupta et al., "Characterizing Exhaled Airflow from Breathing and Talking," Indoor Air, vol. 20, pp. 31-39, year 2010.
Mirza et al., "Analytical Modeling and Simulation of a CMOS-MEMS Cantilever Based CO2 Sensor for Medical Applications," Proceedings IEEE Regional Symposium on Micro and Nanoelectronics, pp. 70-73, Sep. 27, 2013.
Bhagya et al., "Speed of Sound-Based Capnographic Sensor with Second-Generation CNN for Automated Classification of Cardiorespiratory Abnormalities," IEEE Sensors Journal, vol. 19, issue 19, pp. 8887-8894, Oct. 1, 2019.
Kohler, "Multi-Lingual Phoneme Recognition Exploiting Acoustic-Phonetic Similarities of Sounds", 4th International Conference on Spoken Language Processing (ICSLP 96), pp. 1-4, Oct. 3-6, 1996.
Pitts et al., "Using Voluntary Cough To Detect Penetration and Aspiration During Oropharyngeal Swallowing in Patients With Parkinson Disease", CHEST, vol. 138, issue 6, pp. 1426-1431, Dec. 2010.
Sooful et al., "An acoustic distance measure for automatic cross-language phoneme mapping", PRASA proceedings, pp. 1-4, year 2001.
Sooful et al., "Comparison of acoustic distance measures for automatic cross-language phoneme mapping", 7th International Conference on Spoken Language Processing, pp. 1-4, Sep. 16-20, 2002.
Sterling et al., "Automated Cough Assessment on a Mobile Platform", Journal of Medical Engineering, pp. 1-10, year 2014.
Vaswani et al., "Attention is all you need", 31st Conference on Neural Information Processing systems, pp. 1-11, year 2017.
Zeng et al., "A new distance measure for hidden Markov models", Expert Systems with Applications, vol. 37, pp. 1550-1555, year 2010.
Rabiner et al., "Fundamentals of Speech Recognition", Prentice Hall, chapters 7-8, pp. 390-481, year 1993.
Wikipedia, "Breathing," pp. 1-13, last edited Oct. 17, 2021, as downloaded from https://en.wikipedia.org/wiki/Breathing.
"Sound Speed in Gases," Sound and Hearing, HyperPhysics, Department of Physics and Astronomy, Georgia State University, USA, pp. 1-3, year 2017, as downloaded from http://hyperphysics.phy-astr.gsu.edu/hbase/Sound/souspe3.html.
"Echo Devices," Amazon.com, Inc, Interest-Based Ads, pp. 1-6, year 2021, as downloaded from https://www.amazon.com/echo-devices/s?k=echo+devices.

"The Best Google Home Speakers in 2021," Tom's Guide, Future US Inc., pp. 1-21, year 2021, as downloaded from https://www.tomsguide.com/best-picks/best-google-home-speakers.
West et al., "Measurements of Pulmonary Gas Exchange Efficiency using Expired Gas and Oximetry: Results in Normal Subjects," American Journal of Physiology—Lung Cellular and Molecular Physiology, vol. 314, No. 4, pp. L686-L689, year 2018.
West et al., "A New Method for Noninvasive Measurement of Pulmonary Gas Exchange Using Expired Gas," Respiratory Physiology & Neurobiology, vol. 247, pp. 112-115, year 2018.
Huang et al., "An Accurate Air Temperature Measurement System Based on an Envelope Pulsed Ultrasonic Time-of-Flight Technique," Review of Scientific Instruments, vol. 78, pp. 115102-1-115102-9, year 2007.
Jedrusyna, "An Ultrasonic Air Temperature Meter", Book "Recent Advances in Mechatronics", Springer, Berlin, Heidelberg, pp. 85-89, year 2010.
Cramer, "The Variation of the Specific Heat Ratio and the Speed of Sound in Air with Temperature, Pressure, Humidity, and CO2 Concentration," Journal of the Acoustical Society of America, vol. 93, No. 5, pp. 2510-2516, May 1993.
Rao et al., "Acoustic Methods for Pulmonary Diagnosis," HHS Public Access, Author manuscript, pp. 1-39, year 2020 (final version published in IEEE Reviews in Biomedical Engineering, vol. 12, pp. 221-239, year 2019).
Cohen, "Signal processing methods for upper airway and pulmonary dysfunction diagnosis," IEEE Engineering in Medicine and Biology Magazine, vol. 9, No. 1, pp. 72-75, Mar. 1, 1990.
Ney, "The Use of a One-Stage Dynamic Programming Algorithm for Connected Word Recognition," IEEE Transactions on Acoustics, Speech, and Signal Processing, vol. ASSP-32, No. 2, pp. 263-271, Apr. 1984.
Haimi-Cohen et al., U.S. Appl. No. 18/105,847, filed Feb. 5, 2023.
Sakran et al., "A Review: Automatic Speech Segmentation", International Journal of Computer Science and Mobile Computing (IJCSMC), vol. 6, issue 4, pp. 308-315, Apr. 2017.
Nicora et al., "Evaluating pointwise reliability of machine learning prediction", Journal of Biomedical Informatics, vol. 127, pp. 1-15, Mar. 2022.
JP Application # 2021-517971 Office Action dated May 16, 2023.
EP Application # 21209891.7 Office Action dated May 19, 2023.
Indian Application # 202247066856 Office Action dated Mar. 29, 2023.
EP Application # 19201720.0 Office Action dated Mar. 30, 2023.
EP Application # 20158058.6 Summons to Oral Proceedings dated Apr. 19, 2023.
Haimi-Cohen et al., U.S. Appl. No. 18/105,848, filed Feb. 5, 2023.
Katsir et al., U.S. Appl. No. 18/319,518, filed May 18, 2023.
Haimi-Cohen et al., U.S. Appl. No. 18/328,739, filed Jun. 4, 2023.
International Application # PCT/IB2024/050483 Search Report dated May 7, 2024.
EP Application # 21832054.7 Search Report dated Mar. 11, 2024.
International Application # PCT/IB2024/054360 Search Report dated Jun. 28, 2024.
JP Application # 2022576351 Office Action dated Jul. 2, 2024.
US Application # U.S. Appl. No. 17/902,836 Office Action Jul. 8, 2024.
International Application # PCT/IB2024/054359 Search Report dated Jul. 9, 2024.
AU Application # 2021384028 Office Action Aug. 15, 2024.
EP Application # 24181539.8 Search Report dated Sep. 4, 2024.
US Office Action U.S. Appl. No. 18/319,518 dated Jun. 6, 2025.
CN Application # 202180045274.0 Office Action dated Feb. 28, 2025.
Voleti et al., "A Review of Automated Speech and Language Features for Assessment of Cognitive and Thought Disorders," IEEE Journal of Selected Topics in Signal Processing, vol. 14, No. 2, pp. 282-298, Feb. 2020.
U.S. Appl. No. 18/328,739 Office Action dated Apr. 25, 2025.
U.S. Appl. No. 18/105,847 Office Action dated May 6, 2025.
CN Application # 202180017631.2 Office Action dated Mar. 31, 2025.

(56) References Cited

OTHER PUBLICATIONS

Canadian Examination report, application # 3,114,864, dated Oct. 16, 2025.
Korean Office Action, application # 10-2021-7032027, dated Oct. 24, 2025.
Korean Office Action, application # 10-2021-7032025, dated Sep. 26, 2025.

* cited by examiner

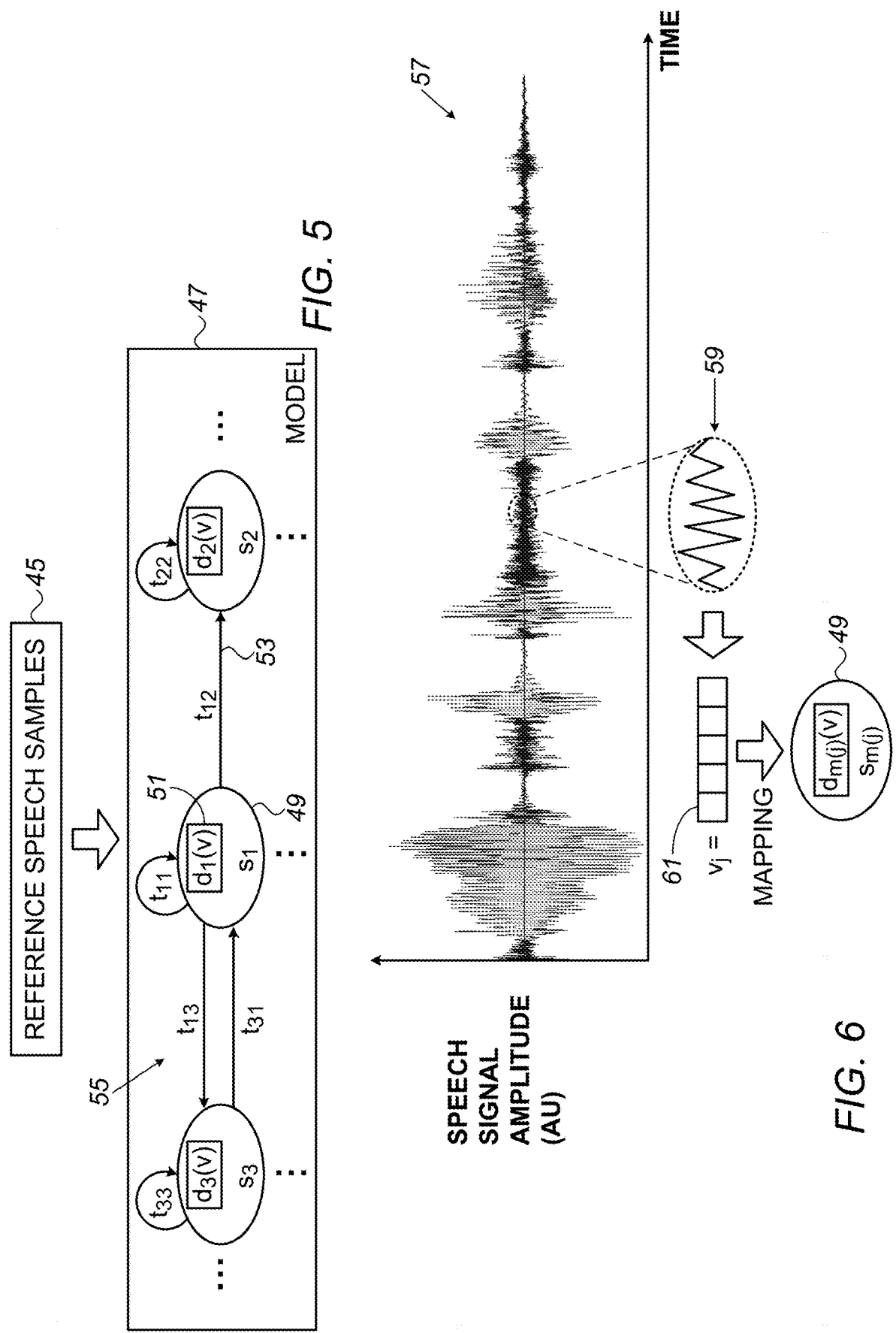

ANALYZING SPEECH USING SPEECH-SAMPLE ALIGNMENT AND SEGMENTATION BASED ON ACOUSTIC FEATURES

CROSS-REFERENCE TO RELATED APPLICATIONS

The present application is a continuation-in-part of U.S. application Ser. No. 17/233,487, filed Apr. 18, 2021, which is a continuation of U.S. application Ser. No. 16/299,178 (issued as U.S. Pat. No. 11,011,188), filed Mar. 12, 2019. The respective disclosures of the aforementioned applications are incorporated herein by reference.

The present application is also related to another application entitled "Analyzing speech using speech models and segmentation based on acoustic features" (Ser. No. 18/328,739), filed on even date herewith.

FIELD OF THE INVENTION

The present invention relates to automatic speech analysis, particularly for assessing the physiological state of a subject.

BACKGROUND

Sakoe and Chiba, "Dynamic Programming Algorithm Optimization for Spoken Word Recognition," IEEE Transactions on Acoustics, Speech, and Signal Processing 26.2 (1978): 43-49, whose disclosure is incorporated herein by reference, reports on an optimum dynamic programming (DP) based time-normalization algorithm for spoken word recognition. First, a general principle of time-normalization is given using a time-warping function. Then, two time-normalized distance definitions, called symmetric and asymmetric forms, are derived from the principle. These two forms are compared with each other through theoretical discussions and experimental studies. The symmetric form algorithm superiority is established. A technique, called slope constraint, is introduced, in which the warping function slope is restricted so as to improve discrimination between words in different categories.

U.S. Pat. No. 7,457,753 describes a system for remote assessment of a user. The system comprises application software resident on a server and arranged to interact across a network with a user operating a client device to obtain one or more sample signals of the user's speech. A datastore is arranged to store the user speech samples in association with details of the user. A feature extraction engine is arranged to extract one or more first features from respective speech samples. A comparator is arranged to compare the first features extracted from a speech sample with second features extracted from one or more reference samples and to provide a measure of any differences between the first and second features for assessment of the user.

US Patent Application Publication 2009/0099848 describes a system and method for passive diagnosis of dementias. Clinical and psychometric indicators of dementias are automatically identified by longitudinal statistical measurements, and mathematical methods are used to track the nature of language change and/or patient audio features. The disclosed system and method include multi-layer processing units wherein initial processing of the recorded audio data is processed in a local unit. Processed and required raw data is also transferred to a central unit which performs in-depth analysis of the audio data.

SUMMARY OF THE INVENTION

There is provided, in accordance with some embodiments of the present invention, a system including an output interface and one or more processors configured to cooperatively carry out a process. The process includes mapping a test speech sample, which was produced by a subject while a physiological state of the subject was unknown, to a reference speech sample, which was produced in a known physiological state. The process further includes, based on the mapping, computing a distance between the test speech sample and the reference speech sample, and in response to the distance, communicating, via the output interface, an output indicating the physiological state of the subject while the test speech sample was produced.

There is further provided, in accordance with some embodiments of the present invention, a method including mapping, by a processor, a test speech sample, which was produced by a subject while a physiological state of the subject was unknown, to a reference speech sample, which was produced in a known physiological state. The method further includes, based on the mapping, computing a distance between the test speech sample and the reference speech sample, and in response to the distance, communicating an output indicating the physiological state of the subject while the test speech sample was produced.

In some embodiments, the reference speech sample was produced by the subject.

In some embodiments, the method further includes, prior to the mapping, verifying that the test speech sample and reference speech sample include the same verbal content.

In some embodiments,
the reference speech sample was divided into multiple reference-sample segments based on differences in acoustic properties between each pair of successive ones of the reference-sample segments,
mapping the test speech sample to the reference speech sample includes:
dividing the test speech sample into multiple test-sample segments based on differences in the acoustic properties between each pair of successive ones of the test-sample segments; and
mapping at least some of the test-sample segments to corresponding ones of the reference-sample segments, and
computing the distance includes computing the distance based on respective local distances between the mapped test-sample segments and the corresponding ones of the reference-sample segments.

In some embodiments,
the reference speech sample was divided into N reference-sample segments,
dividing the test speech sample includes dividing the test speech sample into N test-sample segments, and
mapping the at least some of the test-sample segments to the corresponding ones of the reference-sample segments includes mapping an $i^{th}$ one of the test-sample segments to an $i^{th}$ one of the reference-sample segments for i=1 . . . N.

In some embodiments,
the reference-sample segments were labeled as corresponding to respective reference-sample speech units, and dividing the test-speech sample includes dividing the
test-speech sample such that the test-sample segments
are labeled as corresponding to respective test-sample
speech units.

In some embodiments, mapping the at least some of the
test-sample segments to the corresponding ones of the
reference-sample segments includes mapping the at least
some of the test-sample segments to the corresponding ones
of the reference-sample segments by finding the correspondence that minimizes, under one or more predefined constraints, a function of respective measures of dissimilarity
between the test-sample speech units of the mapped test-sample segments and the reference-sample speech units of
the corresponding ones of the reference-sample segments.

In some embodiments, dividing the test speech sample
includes dividing the test speech sample while constraining
the test-sample speech units responsively to the reference-sample speech units.

In some embodiments, the method further includes:
computing respective test-sample feature vectors quantifying acoustic features of the test-sample segments; and
computing respective reference-sample feature vectors
quantifying the acoustic features of the reference-sample segments, and
mapping the at least some of the test-sample segments to
the corresponding ones of the reference-sample segments includes mapping the at least some of the test-sample segments to the corresponding ones of the
reference-sample segments by finding the correspondence that minimizes, under one or more predefined
constraints, a function of respective measures of dissimilarity between the test-sample feature vectors of
the mapped test-sample segments and the reference-sample feature vectors of the corresponding ones of the
reference-sample segments.

In some embodiments, the method further includes:
computing respective test-sample feature vectors quantifying acoustic features of the mapped test-sample segments;
computing respective reference-sample feature vectors
quantifying the acoustic features of the corresponding
ones of the reference-sample segments; and
computing the local distances by computing the local
distances between the test-sample feature vectors and
the reference-sample feature vectors, respectively.

In some embodiments, computing the test-sample feature
vectors includes:
dividing the test speech sample into multiple frames, such
that each of the test-sample segments includes a different respective subset of the frames; and
for each of the mapped test-sample segments:
computing multiple test-frame feature vectors quantifying the acoustic features of the subset of the frames
included in the test-sample segment, and
computing the test-sample feature vector for the test-sample segment based on the test-frame feature
vectors.

In some embodiments, computing the test-sample feature
vector for the test-sample segment includes computing the
test-sample feature vector for the test-sample segment based
on a statistic of the test-frame feature vectors.

In some embodiments, computing the test-sample feature
vector for the test-sample segment includes:
fitting respective functions to one or more components of
the test-frame feature vectors; and
computing the test-sample feature vector for the test-sample segment based on parameters of the functions.

There is further provided, in accordance with some
embodiments of the present invention, a computer software
product including a tangible non-transitory computer-readable medium in which program instructions are stored. The
instructions, when read by a processor, cause the processor
to map a test speech sample, which was produced by a
subject while a physiological state of the subject was
unknown, to a reference speech sample, which was produced in a known physiological state. The instructions
further cause the processor to compute, based on the mapping, a distance between the test speech sample and the
reference speech sample. The instructions further cause the
processor to communicate, in response to the distance, an
output indicating the physiological state of the subject while
the test speech sample was produced.

There is further provided, in accordance with some
embodiments of the present invention, a system including an
output interface and one or more processors configured to
cooperatively carry out a process. The process includes
mapping a test speech sample, which was produced by a
subject while a physiological state of the subject was
unknown, to a speech model representing speech produced
in a known physiological state, which speech model
includes multiple acoustic states and defines allowed transitions between the acoustic states. The process further
includes, based on the mapping, computing a distance
between the test speech sample and the speech model, and
in response to the distance, communicating, via the output
interface, an output indicating the physiological state of the
subject while the test speech sample was produced.

There is further provided, in accordance with some
embodiments of the present invention, a method including
mapping, by a processor, a test speech sample, which was
produced by a subject while a physiological state of the
subject was unknown, to a speech model representing
speech produced in a known physiological state, which
speech model includes multiple acoustic states and defines
allowed transitions between the acoustic states. The method
further includes, based on the mapping, computing a distance between the test speech sample and the speech model,
and in response to the distance, communicating an output
indicating the physiological state of the subject while the test
speech sample was produced.

In some embodiments, mapping the test speech sample to
the speech model includes:
dividing the test speech sample into a sequence of test-sample segments based on differences in acoustic properties between each pair of successive ones of the
test-sample segments; and
mapping at least some of the test-sample segments to
corresponding ones of the acoustic states.

In some embodiments,
the speech model allows only a single sequence of the
acoustic states, the allowed sequence being of length N,
dividing the test speech sample includes dividing the test
speech sample into N test-sample segments, and
mapping the at least some of the test-sample segments to
the corresponding ones of the acoustic states includes
mapping an $i^{th}$ one of the test-sample segments to an $i^{th}$
acoustic state in the sequence of the acoustic states for
i=1 . . . N.

In some embodiments, any sequence of the acoustic states
allowed by the speech model corresponds to particular
verbal content, and the method further includes, prior to the
mapping, verifying that the test speech sample includes the
particular verbal content.

In some embodiments,
the acoustic states correspond to different respective speech-model speech units, and
dividing the test-speech sample includes dividing the test-speech sample such that the test-sample segments are labeled as corresponding to respective test-sample speech units.

In some embodiments, mapping the at least some of the test-sample segments to the corresponding ones of the acoustic states includes mapping the at least some of the test-sample segments to the corresponding ones of the acoustic states by finding the correspondence that minimizes, under one or more predefined constraints, a function based on a dissimilarity between the test-sample speech units of the mapped test-sample segments and the speech-model speech units of the corresponding ones of the acoustic states.

In some embodiments, the speech model specifies respective probabilities for the allowed transitions, and the function is based on a probability of a sequence of the corresponding ones of the acoustic states as derived from the specified probabilities.

In some embodiments, dividing the test speech sample includes dividing the test speech sample while constraining the test-sample speech units responsively to the allowed transitions.

In some embodiments, the speech model specifies respective probabilities for the allowed transitions, and dividing the test speech sample includes dividing the test speech sample while constraining the test-sample speech units responsively to the probabilities.

In some embodiments, the method further includes, subsequently to dividing the test speech sample and prior to the mapping, modifying the sequence of the test-sample segments responsively to the allowed transitions.

In some embodiments, modifying the sequence of the test-sample segments includes modifying the sequence of the test-sample segments so as to minimize a cost function, which is based on a measure of dissimilarity between the sequence prior to the modification and the sequence subsequent to the modification.

In some embodiments, the speech model specifies respective probabilities for the allowed transitions, and the cost function is based on a probability of the modified sequence as derived from the specified probabilities.

In some embodiments, computing the distance includes computing the distance based on the cost function.

In some embodiments, modifying the sequence of the test-sample segments includes modifying the sequence of the test-sample segments, concurrently with the mapping, so as to minimize a cost function based on local distances between the mapped test-sample segments and the corresponding ones of the acoustic states.

In some embodiments, the cost function is based on a measure of dissimilarity between the sequence prior to the modification and the sequence subsequent to the modification.

In some embodiments, the method further includes computing respective test-sample feature vectors quantifying acoustic features of the test-sample segments, and
mapping the at least some of the test-sample segments to the corresponding ones of the acoustic states includes mapping the at least some of the test-sample segments to the corresponding ones of the acoustic states by finding the correspondence that minimizes, under one or more predefined constraints, a function of respective measures of dissimilarity between the test-sample feature vectors of the mapped test-sample segments and the corresponding ones of the acoustic states.

In some embodiments,
the acoustic states are associated with respective local distance functions,
the method further includes:
computing respective test-sample feature vectors quantifying acoustic features of the mapped test-sample segments; and
computing respective local distances between the mapped test-sample segments and the corresponding ones of the acoustic states, by inputting the test-sample feature vectors to the local distance functions of the corresponding ones of the acoustic states, respectively, and
computing the distance includes computing the distance based on the local distances.

In some embodiments, computing the test-sample feature vectors includes:
dividing the test speech sample into multiple frames, such that each of the test-sample segments includes a different respective subset of the frames; and
for each of the mapped test-sample segments:
computing multiple test-frame feature vectors quantifying the acoustic features of the subset of the frames included in the test-sample segment, and
computing the test-sample feature vector for the test-sample segment based on the test-frame feature vectors.

In some embodiments, computing the test-sample feature vector for the test-sample segment includes computing the test-sample feature vector for the test-sample segment based on a statistic of the test-frame feature vectors.

In some embodiments, computing the test-sample feature vector for the test-sample segment includes:
fitting respective functions to one or more components of the test-frame feature vectors; and
computing the test-sample feature vector for the test-sample segment based on parameters of the functions.

There is further provided, in accordance with some embodiments of the present invention, a computer software product including a tangible non-transitory computer-readable medium in which program instructions are stored. The instructions, when read by a processor, cause the processor to map a test speech sample, which was produced by a subject while a physiological state of the subject was unknown, to a speech model representing speech produced in a known physiological state, which speech model includes multiple acoustic states and defines allowed transitions between the acoustic states. The instructions further cause the processor to compute, based on the mapping, a distance between the test speech sample and the speech model, and to communicate, in response to the distance, an output indicating the physiological state of the subject while the test speech sample was produced.

There is further provided, in accordance with some embodiments of the present invention, a system including an output interface and one or more processors configured to cooperatively carry out a process. The process includes obtaining a representation of reference speech produced in a known physiological state, the representation including multiple components. The process further includes dividing a test speech sample, which was produced by a subject while a physiological state of the subject was unknown, into a sequence of test-sample segments based on differences in acoustic properties between each pair of successive ones of the test-sample segments. The process further includes mapping at least some of the test-sample segments to corresponding ones of the components. The process further includes, based on the mapping, computing a distance between the test speech sample and the representation of the reference speech, and in response to the distance, communicating, via the output interface, an output indicating the physiological state of the subject while the test speech sample was produced.

There is further provided, in accordance with some embodiments of the present invention, a method including obtaining a representation of reference speech produced in a known physiological state, the representation including multiple components. The method further includes dividing a test speech sample, which was produced by a subject while a physiological state of the subject was unknown, into a sequence of test-sample segments based on differences in acoustic properties between each pair of successive ones of the test-sample segments. The method further includes mapping at least some of the test-sample segments to corresponding ones of the components. The mapping further includes, based on the mapping, computing a distance between the test speech sample and the representation of the reference speech, and in response to the distance, communicating an output indicating the physiological state of the subject while the test speech sample was produced.

In some embodiments,
the representation is a reference speech sample, which was divided into multiple reference-sample segments based on differences in the acoustic properties between each pair of successive ones of the reference-sample segments, and
the components are the reference-sample segments.

In some embodiments,
the representation is a speech model including multiple acoustic states and defining allowed transitions between the acoustic states, and
the components are the acoustic states.

In some embodiments, the reference speech was produced by the subject.

In some embodiments,
the representation includes a sequence of the components of length N,
dividing the test speech sample includes dividing the test speech sample into N test-sample segments, and
mapping the at least some of the test-sample segments to the corresponding ones of the components includes mapping an $i^{th}$ one of the test-sample segments to an $i^{th}$ one of the components for i=1 . . . N.

In some embodiments, the representation corresponds to particular verbal content, and the method further includes, prior to the mapping, verifying that the test speech sample includes the particular verbal content.

In some embodiments,
the components correspond to respective reference speech units, and
dividing the test-speech sample includes dividing the test-speech sample such that the test-sample segments are labeled as corresponding to respective test-sample speech units.

In some embodiments, mapping the at least some of the test-sample segments to the corresponding ones of the components includes mapping the at least some of the test-sample segments to the corresponding ones of the components by finding the correspondence that minimizes a function based on a dissimilarity between the test-sample speech units of the mapped test-sample segments and the reference speech units of the corresponding ones of the components.

In some embodiments,
the representation is a speech model including multiple acoustic states, which speech model defines allowed transitions between the acoustic states and specifies respective probabilities for the allowed transitions,
the components are the acoustic states, and
the function is based on a probability of a sequence of the corresponding ones of the acoustic states as derived from the specified probabilities.

In some embodiments,
the representation is a reference speech sample, which was divided into multiple reference-sample segments based on differences in the acoustic properties between each pair of successive ones of the reference-sample segments,
the components are the reference-sample segments, and
dividing the test speech sample includes dividing the test speech sample while constraining the test-sample speech units responsively to the reference speech units.

In some embodiments,
the representation is a speech model including multiple acoustic states, which speech model defines allowed transitions between the acoustic states,
the components are the acoustic states, and
dividing the test speech sample includes dividing the test speech sample while constraining the test-sample speech units responsively to the allowed transitions.

In some embodiments, the speech model specifies respective probabilities for the allowed transitions, and dividing the test speech sample includes dividing the test speech sample while constraining the test-sample speech units responsively to the probabilities.

In some embodiments,
the representation is a speech model including multiple acoustic states, which speech model defines allowed transitions between the acoustic states,
the components are the acoustic states, and
the method further includes, subsequently to dividing the test speech sample and prior to the mapping, modifying the sequence of the test-sample segments responsively to the allowed transitions.

In some embodiments, modifying the sequence of the test-sample segments includes modifying the sequence of the test-sample segments so as to minimize a cost function, which is based on a measure of dissimilarity between the sequence prior to the modification and the sequence subsequent to the modification.

In some embodiments, the speech model specifies respective probabilities for the allowed transitions, and the cost function is based on a probability of the modified sequence as derived from the specified probabilities.

In some embodiments, computing the distance includes computing the distance based on the cost function.

In some embodiments, modifying the sequence of the test-sample segments includes modifying the sequence of the test-sample segments, concurrently with the mapping, so as to minimize a cost function based on respective local distances between the mapped test-sample segments and the corresponding ones of the acoustic states.

In some embodiments, the cost function is based on a measure of dissimilarity between the sequence prior to the modification and the sequence subsequent to the modification.

In some embodiments, the method further includes computing respective test-sample feature vectors quantifying acoustic features of the test-sample segments, and mapping the at least some of the test-sample segments to the corresponding ones of the components includes mapping the at least some of the test-sample segments to the corresponding ones of the components by finding the correspondence that minimizes, under one or more predefined constraints, a function of respective measures of dissimilarity between the test-sample feature vectors of the mapped test-sample segments and the corresponding ones of the components.

In some embodiments, the method further includes:

computing respective test-sample feature vectors quantifying acoustic features of the mapped test-sample segments; and computing respective local distances between the mapped test-sample segments and the corresponding ones of the components based on the test-sample feature vectors, and computing the distance includes computing the distance based on the local distances.

In some embodiments, computing the test-sample feature vectors includes:

dividing the test speech sample into multiple frames, such that each of the test-sample segments includes a different respective subset of the frames; and for each of the mapped test-sample segments:

computing multiple test-frame feature vectors quantifying the acoustic features of the subset of the frames included in the test-sample segment, and computing the test-sample feature vector for the test-sample segment based on the test-frame feature vectors.

In some embodiments, computing the test-sample feature vector for the test-sample segment includes computing the test-sample feature vector for the test-sample segment based on a statistic of the test-frame feature vectors.

In some embodiments, computing the test-sample feature vector for the test-sample segment includes:

fitting respective functions to one or more components of the test-frame feature vectors; and computing the test-sample feature vector for the test-sample segment based on parameters of the functions.

There is further provided, in accordance with some embodiments of the present invention, a computer software product including a tangible non-transitory computer-readable medium in which program instructions are stored. The instructions, when read by a processor, cause the processor to obtain a representation of reference speech produced in a known physiological state, the representation including multiple components. The instructions further cause the processor to divide a test speech sample, which was produced by a subject while a physiological state of the subject was unknown, into a sequence of test-sample segments based on differences in acoustic properties between each pair of successive ones of the test-sample segments. The instructions further cause the processor to map at least some of the test-sample segments to corresponding ones of the components. The instructions further cause the processor to compute, based on the mapping, a distance between the test speech sample and the representation of the reference speech. The instructions further cause the processor to communicate, in response to the distance, an output indicating the physiological state of the subject while the test speech sample was produced.

The present invention will be more fully understood from the following detailed description of embodiments thereof, taken together with the drawings, in which:

BRIEF DESCRIPTION OF THE DRAWINGS

FIG. 5 is a schematic illustration of a speech model, in accordance with some embodiments of the present invention;

FIG. 6 is a schematic illustration of a mapping of a test speech sample to a speech model, in accordance with some embodiments of the present invention.

DETAILED DESCRIPTION OF EMBODIMENTS

Overview

Figure 1:
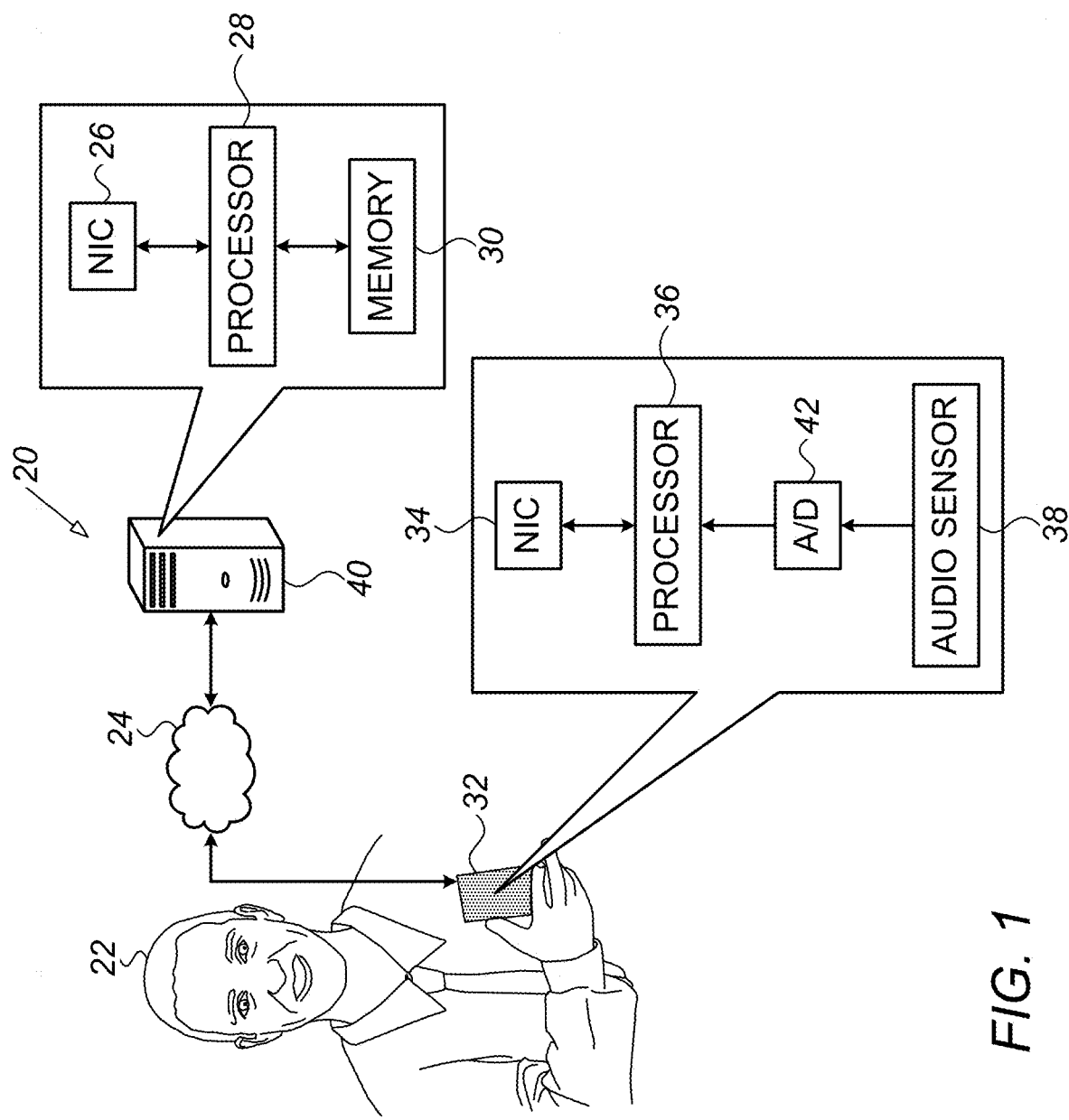
FIG. 1 is a schematic illustration of a system for evaluating the physiological state of a subject, in accordance with some embodiments of the present invention.

Embodiments of the present invention include a system for evaluating the physiological state of a subject by analyzing speech of the subject. In response to the evaluation, the system may communicate an output such as an alert to the subject, to the subject's physician, and/or to a monitoring service. The alert may indicate the need for medical intervention or monitoring, or may simply indicate that the subject should refrain from certain activities in the subject's current state.

For example, by analyzing the subject's speech, the system may evaluate the state of the subject with respect to a physiological condition such as congestive heart failure (CHF), coronary heart disease, atrial fibrillation or any other type of arrhythmia, chronic obstructive pulmonary disease (COPD), asthma, interstitial lung disease, pulmonary edema, pleural effusion, Parkinson's disease, bipolar disorder, depression, or any other psychological or emotional disorder affecting speech. Alternatively, for example, by analyzing the subject's speech, the system may detect whether the subject is fatigued, agitated, unfocused, confused, or otherwise in an abnormal physiological state.

To evaluate the physiological state of the subject, the system first obtains (i.e., receives or computes) a representation of reference speech produced in a known physiological state.

For example, the representation may be a reference speech sample, which includes reference speech produced by the subject while the subject was in the known physiological state, or by another subject while the other subject was in the known physiological state. Alternatively, the reference speech sample may be produced by a speech synthesizer, based on reference speech produced by the subject and/or one or more other subjects while in the known physiological state.

Alternatively, the representation may be a speech model including multiple acoustic states and defining allowed transitions between the acoustic states, thereby, in effect, defining allowed orderings of the acoustic states. Each allowed transition may, optionally, take previous transitions into account, such that, for example, a transition from a first state to a second state may be allowed if the first state was reached from a third state, but not if the first state was reached from a fourth state. Optionally, in defining the allowed transitions, the speech model may designate a subset of the acoustic states as starting states and/or another subset of the acoustic states as ending states, such that each allowed ordering starts at a starting state and ends at an ending state. The speech model may be constructed based on reference speech produced by the subject and/or one or more other subjects while in the known physiological state.

One example of such a speech model is a Hidden Markov Model (HMM). Another example is a model based on a deep neural network (DNN) architecture, which is trained to compare input speech to one or more allowed sequences of acoustic states and to output a distance in response thereto. This distance quantifies the degree to which the input speech matches the most similar allowed sequence of acoustic states.

Typically, for embodiments in which the speech of other subjects is used as a reference, the other subjects are similar to the subject with respect to factors such as gender, age, medical history, and vocal properties.

In some embodiments, the represented reference speech is produced while in a stable state with respect to a particular physiological condition. For example, a reference speech sample may be acquired from the subject following an indication from the subject's physician that the subject's physiological state is stable. As another example, for a subject who suffers from pulmonary edema, the system may acquire the reference speech sample following treatment of the subject to stabilize the subject's breathing.

It is noted that, in the context of the present application, the physiological state of a subject is said to be "stable" if the subject's health, with respect to the physiological condition, is not deteriorating. The terminology of "stable" and "unstable" is appropriate, for example, in the case of pulmonary edema induced by heart failure, where deviation from the baseline may trigger a chain reaction of further deterioration. In other cases, such as depression, a change in the subject's speech may represent a deterioration of the condition into another stable state. In such cases, early intervention might improve the patient's condition, provided that the physician is alerted to the deterioration. In yet other cases, the deterioration is transient. For example, in bipolar disorder, entering the depressive or manic phase is known to be transient, yet early detection may be important for symptomatic treatment of the symptoms of that phase.

Subsequently to (e.g., several days after) obtaining the representation of the reference speech, when the state of the subject is unknown, the system acquires a "test speech sample" from the subject. Subsequently, the system maps the test speech sample to the representation. Based on the mapping, the system computes a distance value that quantifies the deviation of the test sample from the representation. (As further described below, the distance value may be computed concurrently with, or subsequently to, the mapping.) In response to this distance, the system communicates an output indicating the physiological state of the subject while the test speech sample was produced. For example, for cases in which the reference speech was produced in a stable state, the system may communicate an alert in response to the distance exceeding a predefined threshold. Conversely, for cases in which the reference speech was produced in an unstable state, the system may communicate an alert in response to the distance being less than a predefined threshold.

In some embodiments, to perform the mapping, the system first divides the test speech sample into relatively short frames, which are typically of equal length, and extracts a feature vector from each of the frames. Subsequently, based on the feature vectors, the system maps the frames to respective components of the representation so as to minimize a distance. For embodiments in which a reference speech sample represents the reference speech, the components of the representation are frames of the reference speech sample. For embodiments in which a speech model represents the reference speech, the components are the acoustic states of the model.

For example, for embodiments in which a reference speech sample represents the reference speech, the system may divide the reference speech sample into frames and extract respective feature vectors therefrom. Subsequently, the system may use an alignment algorithm, such as the dynamic time warping (DTW) algorithm described in the reference to Sakoe and Chiba cited above in the Background, to align the test-sample frames with the reference-sample frames such that each of at least some of the test-sample feature vectors corresponds to a respective reference-sample feature vector. (Per the alignment, multiple consecutive test-sample feature vectors may correspond to a single reference-sample feature vector; likewise, multiple consecutive reference-sample feature vectors may correspond to a single test-sample feature vector.) In performing the alignment, the system may minimize a distance based on local distances between pairs of corresponding feature vectors.

Alternatively, for embodiments in which a speech model represents the reference speech, the system may map the test-sample frames to respective acoustic states of the model. In performing this mapping, the system may minimize a distance based on respective local distances between the test-sample feature vectors and the acoustic states. Each local distance may be computed by inputting the test-sample feature vector of the test-sample frame to a local distance function associated with the acoustic state to which the test-sample frame is mapped.

Subsequently to mapping the test-sample frames to the representation, the system may communicate an output responsively to the distance that was minimized in the mapping. Alternatively, the system may recalculate the distance between the test sample and the representation, e.g., by giving greater weight to one or more speech units that are known to be more indicative than others with respect to the particular physiological condition that is being evaluated and/or by using different local distance functions from those that were used for the mapping. (In recalculating the distance, the system does not change the mapping, i.e., each test-sample frame remains mapped to the same component of the representation.) The system may then base the output on the recalculated distance.

In other embodiments, the test speech sample is divided into segments based on differences in acoustic properties between each pair of successive segments. In other words, the test sample is segmented based on the acoustic properties of the sample, such that one segment ends and the next segment begins whenever there is a significant change in the acoustic properties. (Typically, each segment is longer than a frame; for example, each segment may include multiple frames.) Subsequently, at least some of the test-sample segments are mapped to respective components of the representation. (As further described below, a single test-sample segment may be mapped to multiple components, and multiple test-sample segments may be mapped to the same component.)

In particular, for some embodiments in which a reference speech sample represents the reference speech, the reference speech sample is segmented based on the acoustic properties thereof, similarly to the test speech sample. The components of the representation, to which at least some of the test-sample segments are mapped, are the segments of the reference sample. For some embodiments in which a speech model represents the reference speech, the components of the representation are the acoustic states of the model.

In some embodiments, the components of the representation—e.g., the reference-sample segments or the model acoustic states—correspond to respective speech units. In such embodiments, the system may divide the test sample (e.g., using an automatic speech recognition (ASR) algorithm) such that the test-sample segments are labeled as corresponding to respective speech units. Subsequently, when performing the mapping, the system may minimize a distance that is based on respective local distances (or "measures of dissimilarity") between the pairs of speech units mapped to one another. The local distances may be computed using a predefined local distance function that returns a local distance between any two speech units.

Alternatively or additionally, the system may compute a feature vector for each segment of the test sample, e.g., by averaging the respective feature vectors of the frames belonging to the segment. For embodiments in which a reference speech sample is used, the system may similarly compute a feature vector for each segment of the reference sample. Subsequently, the distance minimized when performing the mapping may be based on the respective local distances between the feature vectors of the mapped segments and the components of the representation to which these segments are mapped. For example, for a reference speech sample, each local distance may be the distance (e.g., the Euclidean distance) between a feature vector of a test-sample segment and the corresponding feature vector of a reference-sample segment. For a speech model, each local distance may be computed by inputting the feature vector of the test-sample segment to a local distance function associated with the acoustic state to which the segment is mapped.

Alternatively (e.g., when using a DNN-based speech model), the distance may be minimized without explicitly calculating any local distances.

Optionally, when segmenting the test sample (or reference sample), the system may constrain the output of the segmentation so as to conform to some prior assumptions or expectations.

For example, using a language model, the system may constrain the output to conform to grammatical or syntactical rules. Alternatively or additionally, the constraint may be based on prior knowledge of the verbal content of the speech sample and/or of the subject's phonetic variant of pronunciation.

Alternatively or additionally, when segmenting the test sample in view of a reference speech model, the system may constrain the output based on transitions between acoustic states allowed by the speech model and, optionally, probabilities of these transitions as specified by the speech model.

Alternatively or additionally, the representation may include a particular sequence of components, and the system may constrain the number of test-sample segments to match the number of components in the sequence. (One example of such a sequence of components is a segmented reference speech sample, which includes a sequence of reference-sample segments; another example is a sequence of acoustic states, in the event that the reference speech model allows only one such sequence.) Advantageously, such a constraint may simplify the mapping, in that the system may simply map the $i^{th}$ test-sample segment to the $i^{th}$ component in the sequence, without needing to perform any minimization.

In some cases, the representation corresponds to particular verbal content. For example, a reference speech sample, by definition, corresponds to the verbal content of the sample. As another example, any sequence of acoustic states allowed by the speech model may correspond to particular verbal content; for example, the speech model may allow only a single sequence of acoustic states, or only a limited set of sequences corresponding to the same verbal content uttered with different pronunciations and/or at different speeds. (Speaking at a greater speed may cause some speech units to be skipped or merged.) In such cases, prior to the mapping, the system may verify (e.g., using a binary classifier, such as a binary neural-network classifier) that the test speech sample includes the particular verbal content. In the event that the test speech sample does not include the verbal content, the subject may be prompted to produce another test sample including the verbal content.

For embodiments in which a distance is minimized during the mapping, the system may compute the final output, which is indicative of the subject's physiological state, based on this minimized distance. Alternatively, the system may calculate another distance between the test sample and the representation of reference speech, and base the final output on this other distance. The other distance may be based on respective local distances between the mapped test-sample segments and the corresponding components of the representation. Each local distance may be speech-unit based and/or feature-vector based, as described above.

In the context of the present application, including the claims, a "speech unit" refers to an acoustic-phonetic unit (APU), an acoustic unit (AU), a portion of an APU or of an AU, or a sequence of multiple APUs or AUs. Example speech units include phonemes, diphones, triphones, syllables, words, phrases, and portions of any of the above.

It is noted that APUs are typically defined, manually, based on linguistic or phonetic considerations. In contrast, AUs are defined by an algorithm, based purely on acoustic considerations. Such an algorithm may segment unlabeled speech and then classify the resulting segments based on the acoustic properties of the segments, typically to achieve low intra-class acoustic differences with respect to a predefined criterion. AUs are described, for example, in section 8.2 of L. Rabiner and B-H. Juang, Fundamentals of Speech Recognition, Prentice Hall, 1993, whose disclosure is incorporated herein by reference.

Even though some embodiments are described herein with reference to only one or two particular types of representation of reference speech, it is noted that the scope of the present invention includes the application of these embodiments to any other suitable type of representation.

System Description

Reference is initially made to FIG. 1, which is a schematic illustration of a system 20 for evaluating the physiological state of a subject 22, in accordance with some embodiments of the present invention.

System 20 comprises an audio-receiving device 32, such as a mobile phone, a tablet computer, a laptop computer, a desktop computer, a voice-controlled personal assistant (such as an Amazon Echo™ or Google Home™ device), or a smart speaker device, that is used by subject 22. Device 32 comprises an audio sensor 38 (e.g., a microphone), which converts sound waves to analog electric signals. Device 32 further comprises other circuitry comprising an analog-to-digital (A/D) converter 42, a processor 36, and a network interface, such as a network interface controller (NIC) 34. Typically, device 32 further comprises a digital memory (comprising a volatile memory and/or non-volatile memory), a screen (e.g., a touchscreen), and/or other user interface components, such as a keyboard. In some embodiments, audio sensor 38 (and, optionally, A/D converter 42) belong to a unit that is external to device 32. For example, audio sensor 38 may belong to a headset that is connected to device 32 by a wired or wireless connection, such as a Bluetooth connection.

System 20 further comprises a server 40, comprising a processor 28, a digital memory 30—comprising a volatile memory, such as random access memory (RAM), and, typically, a non-volatile memory, such as a hard drive or flash drive—and other circuitry comprising a network interface, such as a network interface controller (NIC) 26. Server 40 may further comprise a screen, a keyboard, and/or any other suitable user interface components. Typically, server 40 is located remotely from device 32, e.g., in a control center, and server 40 and device 32 communicate with one another, via their respective network interfaces, over a network 24, which may include a cellular network and/or the Internet.

System 20 is configured to evaluate the subject's physiological state by processing one or more speech signals (also referred to herein as "speech samples") received from the subject, as described in detail below. Typically, processor 36 of device 32 and processor 28 of server 40 cooperatively perform the receiving and processing of at least some of the speech samples. For example, as the subject speaks into device 32, the sound waves of the subject's speech may be converted to an analog signal by audio sensor 38, which may in turn be sampled and digitized by A/D converter 42. (In general, the subject's speech may be sampled at any suitable rate, such as a rate between 8 and 48 kHz.) The resulting digital speech signal may be received by processor 36. Processor 36 may then communicate the speech signal, via NIC 34, to server 40, such that processor 28 receives the speech signal via NIC 26. Subsequently, processor 28 may process the speech signal.

Based on the processing of the subject's speech samples, processor 28 may communicate an output indicating the physiological state of the subject. Optionally, such an output may include a description of the subject's state; for example, the output may indicate that the subject's lungs are "wet," i.e., partly filled with fluid.

To communicate the output, processor 28 may place a call or send a message (e.g., a text message) to any suitable device such as the audio-receiving receiving device, another device of the subject, a device of the subject's physician, or a device in a monitoring center. Alternatively or additionally, processor 28 may communicate the output to processor 36, and processor 36 may then communicate the output to the subject, e.g., by displaying a message on the screen of device 32. Alternatively or additionally, processor 28 may post a message or update a status indicator on a website or a monitor (e.g., at a nursing station).

In other embodiments, processor 36 and processor 28 cooperatively perform the aforementioned speech-signal processing. As yet another alternative, all the computing functionality described herein may be performed by processor 36, such that system need not necessarily comprise server 40.

In view of the above, it is noted that any description below to the performance of a particular function by "the processor" includes, within its scope, the performance of the function by processor 28, the performance of the function by processor 36, and the cooperative performance of the function by both processors. It is also noted that the aforementioned output may be communicated via any suitable output interface, such as a network interface (e.g., NIC 26 or NIC 34) or a display interface belonging to device 32 or server 40.

In some embodiments, device 32 comprises an analog telephone that does not comprise an A/D converter or a processor. In such embodiments, device 32 sends the analog audio signal from audio sensor 38 to server 40 over a telephone network. Typically, in the telephone network, the audio signal is digitized, communicated digitally, and then converted back to analog before reaching server 40. Accordingly, server 40 may comprise an A/D converter, which converts the incoming analog audio signal—received via a suitable telephone-network interface—to a digital speech signal. Processor 28 receives the digital speech signal from the A/D converter, and then processes the signal as described herein. Alternatively, server 40 may receive the signal from the telephone network before the signal is converted back to analog, such that the server need not necessarily comprise an A/D converter.

Typically, server 40 is configured to communicate with multiple devices belonging to multiple different subjects, and to process the speech signals of these multiple subjects. Typically, memory 30 stores a database in which data relevant to the speech-sample processing described herein are stored for the subjects. Memory 30 may be internal to server 40, as shown in FIG. 1, or external to server 40. For embodiments in which processor 36 processes the subject's speech, a memory belonging to device 32 may store the relevant data for the subject.

Processor 28 may be embodied as a single processor, or as a cooperatively networked or clustered set of processors. For example, a control center may include a plurality of interconnected servers comprising respective processors, which cooperatively perform the functionality described herein. In some embodiments, processor 28 belongs to a virtual machine.

For each of processor 28 and processor 36, the functionality of the processor may be implemented solely in hardware, e.g., using one or more fixed-function or general-purpose integrated circuits, Application-Specific Integrated Circuits (ASICs), and/or Field-Programmable Gate Arrays (FPGAs). Alternatively, the functionality of the processor may be implemented at least partly in software. For example, the processor may be embodied as a programmed processor comprising a central processing unit (CPU) and/or a Graphics Processing Unit (GPU). Program code, including software programs, and/or data may be loaded for execution and processing by the CPU and/or GPU. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produce a machine or special-purpose computer, configured to perform the tasks described herein.

Comparing the Test Speech Sample to a Reference Speech Sample

In some embodiments, the processor is configured to compare a test speech sample, which was produced by the subject while the physiological state of the subject was unknown, to a reference speech sample, which includes, or is a synthetic representation of, reference speech produced while in a known physiological state.

More specifically, in some embodiments, the processor receives the reference speech sample in its entirety. In other embodiments, the processor synthesizes the reference speech sample from one or more other speech samples produced in the known physiological state. The other speech samples may include, for example, free speech in which multiple speech units are uttered, or an utterance of a predetermined list of speech units. To synthesize the reference speech sample, the processor extracts multiple speech units from the other speech samples using any suitable automatic speech-recognition (ASR) algorithm, and combines the extracted speech units (optionally, with duplication) so as to produce the reference speech sample.

Subsequently to receiving the test speech sample, the processor performs the aforementioned comparison by mapping the test speech sample to the reference speech sample. Based on the mapping, the processor computes a distance between the test speech sample and the reference speech sample. In response to the distance (e.g., in response to comparing the distance to a predefined threshold), the processor communicates an output indicating the physiological state of the subject while the test speech sample was produced.

Typically, the verbal content of the test speech sample is similar or identical to the verbal content of the reference speech sample. For example, the processor may prompt the subject to utter the verbal content of the reference speech sample, e.g., by displaying the verbal content on device 32. Alternatively, the processor may receive (or synthesize) multiple reference speech samples having different verbal content, and then prompt the subject to utter the verbal content of any one of the reference speech samples. For example, the reference speech samples may include different respective answers to a particular question, and the processor may prompt the subject to provide one of the answers to the question. The test speech sample may then be mapped to the corresponding reference speech sample.

In some embodiments, prior to the mapping, the processor verifies (e.g., using a binary classifier) that the test speech sample and reference speech sample include the same verbal content.

In some embodiments, the reference speech is produced by the subject (or another subject) while the physiological state of the subject (or the other subject) is deemed (e.g., by a physician) to be stable with respect to a particular physiological condition. In other embodiments, the reference speech is produced while in an unstable state with respect to the condition.

In yet other embodiments, the test speech sample is mapped to each of two reference speech samples: a stable-state speech sample, and an unstable-state speech sample. Based on the mappings, the processor computes a first distance to the stable-state speech sample and a second distance to the unstable-state speech sample. The processor then compares the two distances to one another, and communicates the output responsively thereto. For example, if the second distance is less than the first distance, indicating that the test sample is more similar to the unstable-state reference sample, the processor may communicate an alert.

Comparing the Test Speech Sample to a Reference Speech Model

In other embodiments, the processor is configured to compare the test speech sample to a speech model representing speech produced in a known physiological state. The speech model includes multiple acoustic states and defines allowed transitions between the acoustic states. Optionally, the speech model may further specify respective probabilities for the allowed transitions. Alternatively or additionally, each acoustic state may be associated with a local distance function, which, given an acoustic feature vector, returns a local distance between the feature vector and the acoustic state. In some embodiments, the acoustic states are labeled as corresponding to different respective speech units.

In some embodiments, the processor receives reference speech, and then computes the speech model based on the reference speech. In other embodiments, the processor receives the speech model, which was previously computed from reference speech. The reference speech may include, for example, free speech in which multiple speech units are uttered, or an utterance of a predetermined list of speech units.

Subsequently to receiving the test speech sample, the processor performs the aforementioned comparison by mapping the test speech sample to the speech model. Based on the mapping, the processor computes a distance between the test speech sample and the speech model. In response to the distance (e.g., in response to comparing the distance to a predefined threshold), the processor communicates an output indicating the physiological state of the subject while the test speech sample was produced.

In some embodiments, prior to the mapping, the processor verifies (e.g., using a binary classifier) that the test speech sample includes verbal content corresponding to an allowed sequence of acoustic states.

In some embodiments, the reference speech underlying the speech model is produced by the subject (or another subject) while the physiological state of the subject (or the other subject) is deemed (e.g., by a physician) to be stable with respect to a particular physiological condition. In other embodiments, the reference speech is produced while in an unstable state with respect to the condition.

In yet other embodiments, the test speech sample is mapped to each of two speech models: a stable-state speech model, and an unstable-state speech model. Based on the mappings, the processor computes a first distance to the stable-state speech model and a second distance to the unstable-state speech model. The processor then compares the two distances to one another, and communicates the output responsively thereto. For example, if the second distance is less than the first distance, indicating that the test sample is more similar to the unstable-state speech model, the processor may communicate an alert.

The section below provides further details regarding the mapping of the test sample to a reference speech sample or speech model.

Frame-Based Mapping (i) Frame-Based Mapping to a Reference Speech Sample

In some embodiments, the processor performs a time-based division of the test sample and reference sample, in that the processor divides each of the samples into frames based on the start and end times of each frame. In general, each frame may be of any suitable duration, such as, for example, between 10 and 100 ms. Typically, the frames are of equal duration, although some embodiments may use pitch-synchronous analysis with frames of varying duration. In some embodiments, the frames overlap each other. For example, each frame may occupy the time period [k*s,k*s+T], where k=0, 1, . . . is the index of the frame, s is the time step between adjacent frames, and T>s is the duration of the frame.

Subsequently, the processor computes respective reference-sample feature vectors quantifying acoustic features of the frames of the reference speech sample, and respective test-sample feature vectors quantifying the same acoustic features of the frames of the test speech sample.

For each frame, the acoustic features may include, for example, a representation of the spectral envelope of the frame, including, for example, linear prediction coefficients, cepstral coefficients (e.g., mel-frequency cepstrum coefficients (MFCCs)), and/or pitch frequency. Alternatively or additionally, the features may include representations of temporal changes in short-term acoustic features, including statistical representations (e.g., a mean and/or variance) and/or functional representations (e.g., a polynomial representing the temporal change). Each feature vector may include any suitable number of features.

Subsequently, the processor maps the test-sample feature vectors to respective ones of the reference-sample feature vectors so as to minimize a total distance between the two samples. For further details regarding this mapping, reference is now made to FIG. 2, which is a schematic illustration of a mapping of a test speech sample to a reference speech sample, in accordance with some embodiments of the present invention.

By way of introduction, it is noted that the mapping (or "alignment") described with reference to FIG. 2 may be represented by a sequence of N pairs of indices $\{(t_1,r_1), \ldots, (t_N,r_N)\}$, where each index $t_i$ is the index of a frame of the test sample (or of a feature vector extracted therefrom), each index $r_i$ is the index of a frame of the reference sample (or of a feature vector extracted therefrom), and hence, each pair of indices $(t_i, r_i)$ represents a correspondence between a frame of the test sample and a frame of the reference sample. For example, the correspondence between the tenth test-sample frame and the eleventh reference-sample frame is represented by the pair of indices (10,11).

Typically, the sequence of index-pairs must satisfy some predefined constraints for the alignment to be valid. Examples for such constraints include:

Monotonicity and continuity: $t_i \leq t_{i+1}$, $r_i \leq r_{i+1}$, and $0 < (r_{i+1}+t_{i+1})-(r_i+t_i) \leq 2$, for i=1, . . . , N−1

A constrained slope: $1 \leq t_{i+2}-t_i \leq 2$ and $1 \leq r_{i+2}-r_i \leq 2$, for i=1, . . . , N−2

Boundary conditions: $t_1=1$, $r_1=1$, $t_N=M$, and $r_N=L$, where M is the number of test-sample frames and L is the number of reference-sample frames Given any particular alignment, the total distance D between the test sample and the reference sample may be defined as $D=\sum_{i=1}^{N} d_i w_i = \sum_{i=1}^{N} d(v_{t_i}^T, v_{r_i}^R) w_i$ where $v_{t_i}^T$ is the $t_i^{th}$ feature vector of the test sample, $v_{r_i}^T$ is the $r_i^{th}$ feature vector of the reference sample, d is a local distance between the two feature vectors that may utilize any suitable distance measure, and each $w_i$ is a weight that is applied to d. In some embodiments, $w_1=2$ and $w_i=(r_i+t_i)-(r_{i-1}+t_{i-1})$ for i=2, . . . , N, such that the sum of the weights is M+L for each alignment, thus eliminating any a priori bias among the different alignments.

Alternatively, the distance D may be derived from the local distances in any other suitable way.

It is noted that in the context of the present application, including the claims, the "local distance" (or "measure of dissimilarity") between two vectors may be calculated using any suitable distance measure. For example, the local distance may be calculated as the L1 or L2 (Euclidean) distance between the two vectors or portions thereof. Alternatively, the distance measure may quantify any sort of deviation, or distortion, of one of the vectors relative to the other, such that the local distance need not necessarily be geometric. For example, it may not necessarily be true that $d(v_{t_i}^T, v_{r_i}^R) = d(v_{r_i}^R, v_{t_i}^T)$, and/or it may not necessarily be true that for any three feature vectors $v_1$, $v_2$, and $v_3$, $d(v_1, v_3) \leq d(v_1, v_2) + d(v_2, v_3)$. An example of a non-geometric distance measure that may be used in embodiments of the present invention is the Itakura-Saito distance measure between vectors of linear-prediction (LPC) coefficients, which is described in section 4.5.4 of the aforementioned reference to Rabiner and Juang, whose disclosure is incorporated herein by reference.

Figure 2:
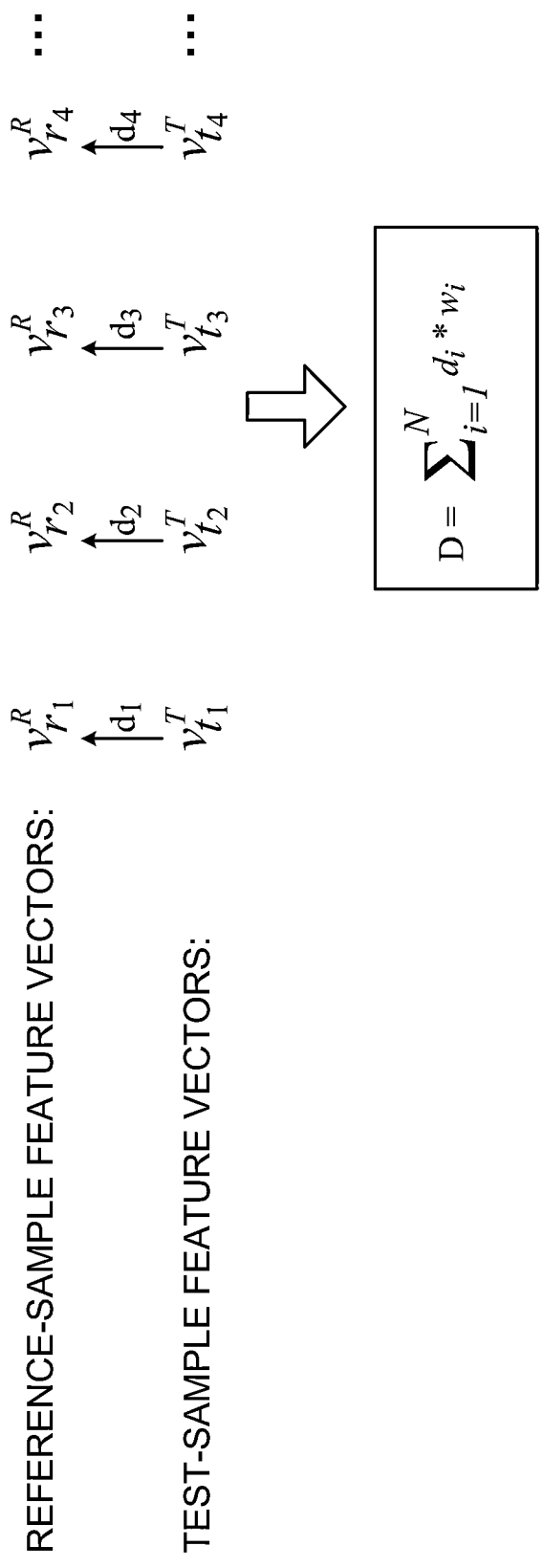
FIG. 2 is a schematic illustration of a mapping of a test speech sample to a reference speech sample, in accordance with some embodiments of the present invention.

Further to the above introduction, FIG. 2 illustrates an alignment of the test sample with the reference sample, which may be performed by the processor, for example, using the dynamic time warping (DTW) algorithm, which is described in the aforementioned reference to Sakoe and Chiba, which is incorporated herein by reference. In particular, FIG. 2 shows a correspondence, resulting from the alignment, between some of the test-sample features vectors and corresponding ones of the reference-sample feature vectors. Each pair of corresponding feature vectors has an associated local distance $d_i$, where $d_i = d(v_{t_i}^T, v_{r_i}^R)$. From among all possible alignments, the processor selects the alignment that minimizes the distance D, e.g., using a dynamic programming algorithm described in section 4.7 of the aforementioned reference to Rabiner and Juang, whose disclosure is incorporated herein by reference. (It is noted that the DTW algorithm includes a dynamic programming algorithm for finding the optimal alignment.)

(To avoid any confusion, it is noted that the four reference-sample feature vectors shown in FIG. 2 are not necessarily the first four feature vectors belonging to the reference sample. For example, $r_2$ may be 2 and $r_3$ may be 4, such that the third reference-sample feature vector is not mapped to. Similarly, the four test-sample feature vectors shown in FIG. 2 are not necessarily the first four feature vectors belonging to the test sample.)

As described above, in response to a distance between the test speech sample and the reference speech sample, the processor generates an output indicating the physiological state of the subject at the time at which the test speech sample was produced. For example, the processor may compare the minimized total distance D, or another distance suitably defined, to a suitable predefined threshold, and generate an output in response to the comparison.

(ii) Frame-Based Mapping to a Speech Model

In some embodiments, the processor computes respective feature vectors for the frames of the test speech sample, as described above. Subsequently, the processor maps the test speech sample to a speech model, by mapping the test-sample feature vectors to respective acoustic states of the speech model such that a total distance is minimized. The total distance is based on respective local distances between the test-sample feature vectors and the respective acoustic states to which the test-sample feature vectors are mapped. These local distances, in turn, are computed from local distance functions associated with the acoustic states. In particular, to compute a local distance, the test-sample feature vector is input to the local distance function.

For further details regarding this mapping, reference is now made to FIG. 5, which is a schematic illustration of a speech model 47, in accordance with some embodiments of the present invention.

In some embodiments, a speech model 47 (in particular, a parametric statistical model representing speech) is constructed from one or more reference speech samples 45. Speech model 47 may be stored, for example, in memory 30 (FIG. 1).

Model 47 includes one or more acoustic states 49 that are exhibited in the reference speech samples. Acoustic states 49 are associated with respective local distance functions 51. Given any acoustic feature vector "v" within the domain of functions 51, the local distance function of each acoustic state returns a local distance that indicates a degree of correspondence between the given acoustic feature vector and the acoustic state. Model 47 further includes the transitions 53 between the acoustic states that are exhibited in the reference speech samples; these transitions are referred to herein as "allowed transitions." In some embodiments, model 47 further defines respective transition distances 55 for the transitions.

For example, FIG. 5 shows an example snippet of a speech model, which includes (i) a first acoustic state $s_1$, having a first local distance function $d_1(v)$, (ii) a second acoustic state $s_2$, having a second local distance function $d_2(v)$, and (iii) a third acoustic state $s_3$, having a third local distance function $d_3(v)$. $s_1$ transitions to $s_2$ with a transition distance $t_{12}$, and to $s_3$ with a transition distance $t_{13}$. $s_3$ transitions to $s_1$ with a transition distance $t_{31}$.

As a specific simplified example, $s_1$ may correspond to the phoneme "\b\," $s_3$ may correspond to the phoneme "\aw\," and $s_2$ may correspond to the phoneme "\ee\," such that the state sequence $s_1 \rightarrow s_4 \rightarrow s_1 \rightarrow s_2$ represents the word "Bobby." (It is noted that, in practice, at least some phonemes may be represented by a sequence of multiple acoustic states.)

In some embodiments, each of the acoustic states is associated with a respective multidimensional probability density function (PDF), from which the local distance between the given feature vector "v" and the acoustic state is implicitly derived. In particular, the PDF provides an estimated likelihood that the given acoustic feature vector corresponds to the acoustic state (i.e., that the given feature vector is derived from speech that was produced while the subject's speech-production system was in the physical state corresponding to the acoustic state), and the local distance is derived from this estimated likelihood. For example, the local distance function of each acoustic state may return a value that depends on the negative log of the estimated likelihood. This value may be, for example, the negative log itself, or a multiple of the negative log.

As a specific example, each acoustic state may be associated with a Gaussian PDF, such that the local distance, when computed as a negative log likelihood, is the sum of the squares of the differences between the components of the feature vector and the corresponding components of the mean of the distribution, weighted by the inverses of the corresponding variances of the distribution.

In other embodiments, the local distances are derived from information-theoretic considerations; one example of a distance measure that is based on such considerations is the Itakura-Saito distance measure, which is described in section 4.5.4 of the aforementioned reference to Rabiner and Juang, whose disclosure is incorporated herein by reference. Alternatively, for embodiments in which both a stable-state model and an unstable-state model are constructed, the local distances may be derived from class-discrimination considerations, in that the local distances may be selected so as to best discriminate between the stable and unstable reference samples. Alternatively, the local distances may be derived from heuristic considerations.

Transition distances 55 are based on underlying transition probabilities, as estimated from the reference speech samples; for example, each transition distance may be the negative log of a respective transition probability. Given that the transition distances and transition probabilities may be derived from one another, the model may be said to specify the former by virtue of specifying the latter, or the latter by virtue of specifying the former.

In general, the parameters of the model (e.g., the parameters of the aforementioned PDFs and the transition probabilities) may be estimated from the reference speech samples using any suitable technique, such as the Baum-Welch algorithm, which is described, for example, in section 6.4.3 of the aforementioned reference to Rabiner and Juang, whose disclosure is incorporated herein by reference.

Reference is now made to FIG. 6, which is a schematic illustration of a mapping of a test speech sample 57 to a speech model, in accordance with some embodiments of the present invention.

As described above, the processor receives test speech sample 57, which was produced by the subject while the subject's physiological state was unknown. Next, the processor computes a plurality of test-sample feature vectors 61 that quantify acoustic features of different respective frames 59 of sample 57. The acoustic features may include, for example, a representation of the spectral envelope of frame 59, including, for example, linear prediction coefficients and/or cepstral coefficients. Vectors 61 may include any suitable number of features; by way of example, FIG. 6 shows a five-dimensional vector $v_j$.

Subsequently to computing the feature vectors, based on the local distance functions and on the allowed transitions that are defined by model 47, the processor maps the test speech sample to a minimum-distance sequence of acoustic states belonging to the model, by mapping the test-sample feature vectors to respective ones of the acoustic states such that the total distance between the test sample and model is minimized. The total distance is based on the respective local distances between the test-sample feature vectors and the acoustic states to which the feature vectors are mapped; for example, the total distance may be based on the sum of the respective local distances.

To explain further, as illustrated in FIG. 6, each mapping of the test speech sample to the model maps each index "j" of the feature vectors to an index m(j) of the acoustic states, such that the $j^{th}$ feature vector $v_j$ is mapped to the acoustic state $s_{m(j)}$. ($s_{m(j)}$ may be any acoustic state to which there is an allowed transition from $s_m(j-1)$.) The mapping of $v_j$ to $s_{m(j)}$ yields a local distance $d_j = d_m(j)(v_j)$ between $v_j$ and $s_{m(j)}$. Thus, assuming N test-sample feature vectors, the test sample is mapped to a sequence of N states, and the sum of the local distances for this mapping is $\Sigma_{j=1}^{N} d_j$. The total distance for the mapping is based on $\Sigma_{j=1}^{N} d_j$. For example, the total distance may be defined as $\Sigma_{j=1}^{N} d_j$, or, if transition distances are included in the model, as $\Sigma_{j=1}^{N} d_j + \Sigma_{j=1}^{N-1} t_{j(j+1)}$, where $t_{j(j+1)}$ is the transition distance from the $j^{th}$ state to the j+1$^{st}$ state. The processor finds the sequence of states for which this total distance is minimized.

By way of example, referring again to FIG. 5, and assuming the processor extracts a sequence of six feature vectors $\{v_1, v_2, v_3, v_4, v_5, v_6\}$ from the test sample, the processor may map the test sample to the minimum-distance state sequence $\{s_1, s_3, s_1, s_2, s_2, s_3\}$. The total distance for this mapping may be computed as $d_1(v_1)+t_{13}+d_3(v_2)+t_{31}+d_1(v_3)+t_{12}+d_2(v_4)+t_{22}+d_2(v_5)+t_{23}+d_3(v_6)$.

In some embodiments, to find the optimal mapping of the test sample to the model, the system uses the Viterbi algorithm, which is described in section 6.4.2 of the aforementioned reference to Rabiner and Juang, whose disclosure is incorporated herein by reference.

As described above, in response to a distance between the test speech sample and the speech model, the processor generates an output indicating the physiological state of the subject at the time at which the test speech sample was produced. For example, the processor may compare the minimized total distance, or another distance suitably defined, to a suitable predefined threshold, and generate an output in response to the comparison.

Segment-Based Mapping

In the frame-based mapping described above, the processor performs a time-based division of the test speech sample, in that the processor simply divides the test speech sample based on the start and stop times of the frames, regardless of the acoustic content of the sample.

In other embodiments, the processor divides the test speech sample into multiple segments based on differences in acoustic properties between each pair of successive segments. (Typically, each segment is longer than a frame; for example, each segment may include multiple frames.) In other words, the test speech sample is segmented based on acoustic properties of the sample, in that one segment ends, and the next segment begins, wherever there is a significant change in the acoustic properties.

These other embodiments are hereby described.
(i) Segment-Based Mapping to a Reference Speech Sample In some embodiments, the reference speech sample was divided (e.g., by the processor) into multiple reference-sample segments based on differences in acoustic properties between each pair of successive ones of the reference-sample segments. In such embodiments, after performing a similar acoustic-property-based division of the test speech sample, the processor maps at least some of the segments of the test sample to corresponding segments of the reference sample. Subsequently to, or concurrently with, performing the mapping, the processor computes a distance between the two samples based on respective local distances between the mapped test-sample segments and the corresponding reference-sample segments.

In some embodiments, the division of the test speech sample is constrained to produce N test-sample segments, where N is the number of reference-sample segments. Such a constraint may be suitable, for example, where the test speech sample is known or assumed to contain the same verbal content as the reference speech sample. (As described above, this may be verified by the processor, e.g., using a binary classifier.) Subsequently to the division of the test speech sample, the i$^{th}$ test-sample segment is mapped to the i$^{th}$ reference-sample segment for i=1 ... N.

In other embodiments, the processor does not constrain the number of test-sample segments. Rather, after segmenting the test sample without such a constraint, the processor finds a mapping that minimizes a particular function.

For example, in some embodiments, the reference-sample segments were labeled (e.g., by the processor) as corresponding to respective reference-sample speech units. The processor divides the test-speech sample such that the test-sample segments are labeled as corresponding to respective test-sample speech units. Subsequently, the processor finds the correspondence between the test-sample segments and the reference-sample segments that minimizes, under one or more predefined constraints, a function of respective measures of dissimilarity between the test-sample speech units of the mapped test-sample segments and the reference-sample speech units of the corresponding reference-sample segments. The value returned by the minimized function may be based on, for example, a "total speech-unit dissimilarity measure," which is the sum of the measures of dissimilarity for the mapped pairs of speech units.

For these measures of dissimilarity, an insertion may be modeled by a mapping of the inserted test-sample speech unit to a null speech unit, and a deletion may be modeled by a mapping of the deleted reference-sample speech unit to the null speech unit.

In some embodiments, the measures of dissimilarity are predefined by a human expert. For example, for a set of speech units (e.g., phonemes) in the subject's language, including the null speech unit, the expert may assign a measure of dissimilarity between each pair of speech units in the set. For example, for a pair of speech units that are very dissimilar to one another, the expert may assign a large measure of dissimilarity, such as infinity. Conversely, the measure of dissimilarity between the speech unit and itself may be zero.

Alternatively, there may be a uniform measure of dissimilarity (e.g., one) for unlike speech units.

As another example, in other embodiments, the processor computes the mapping based on feature vectors of the segments. In other words, the processor computes respective test-sample feature vectors quantifying acoustic features of the test-sample segments and respective reference-sample feature vectors quantifying the (same) acoustic features of the reference-sample segments. Subsequently, the processor finds the correspondence between the test-sample segments and the reference-sample segments that minimizes, under one or more predefined constraints, a function of respective measures of dissimilarity between the test-sample feature vectors of the mapped test-sample segments and the reference-sample feature vectors of the corresponding reference-sample segments. The value returned by the minimized function may be based on, for example, a "total feature-vector dissimilarity measure," which is the sum of the measures of dissimilarity for the mapped pairs of feature vectors.

As yet another example, the processor may find the correspondence that minimizes a function of both (i) respective measures of dissimilarity between the test-sample speech units of the mapped test-sample segments and the reference-sample speech units of the corresponding reference-sample segments, and (ii) respective measures of dissimilarity between the test-sample feature vectors of the mapped test-sample segments and the reference-sample feature vectors of the corresponding reference-sample segments. For example, the function may be based on a weighted sum of the total speech-unit dissimilarity measure and the total feature-vector dissimilarity measure.

Figure 3:
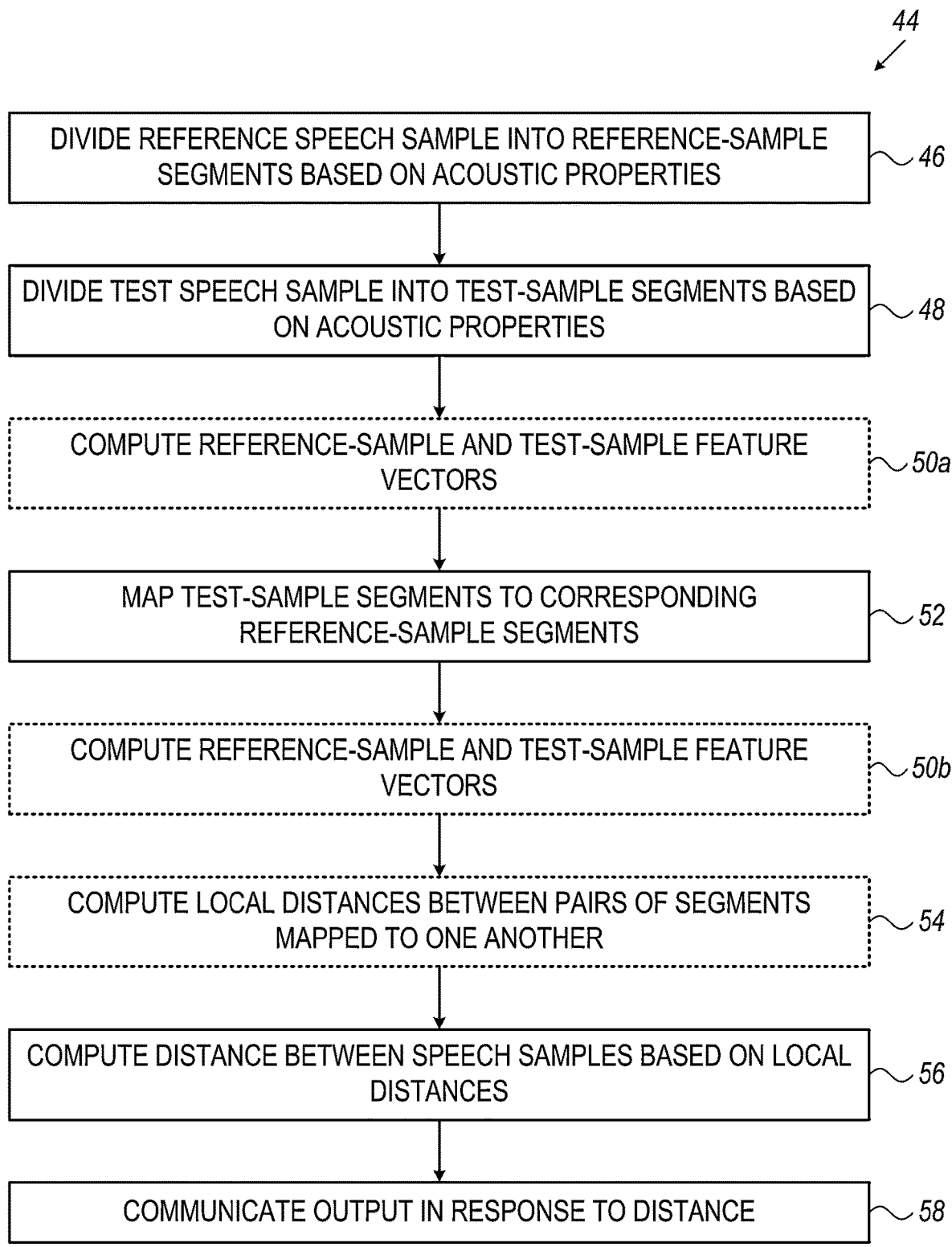
FIG. 3 is a flow diagram for a method for comparing a test speech sample to a reference speech sample, in accordance with some embodiments of the present invention.

For further details, reference is now made to FIG. 3, which is a flow diagram for a method 44 for comparing a test speech sample to a reference speech sample, in accordance with some embodiments of the present invention.

In some embodiments, method 44 includes a first segmenting step 46, at which the processor divides the reference speech sample into multiple reference-sample segments based on differences in acoustic properties between each pair of successive ones of the reference-sample segments. In other embodiments, the reference speech sample is segmented manually by an expert, or by a different processor, prior to the performance of method 44.

At a second segmenting step 48, the processor divides the test speech sample into multiple test-sample segments based on differences in acoustic properties between each pair of successive ones of the test-sample segments.

To perform first segmenting step 46 or second segmenting step 48, the processor may divide the speech sample into relatively short frames of a fixed duration, and compute a feature vector for each frame. Each feature vector may include any suitable acoustic features such as a representation of the spectral envelope of the frame, including, for example, linear prediction coefficients and/or cepstral coefficients (e.g., MFCCs). Subsequently, the processor may segment the sample based on the feature vectors.

For example, the processor may apply a one-dimensional clustering algorithm to the feature vectors. Alternatively, for example, the processor may group the frames based on changes in gradients of the feature vectors. As yet another example, the processor may use the aforementioned Viterbi algorithm so as to segment the sample based on a mapping of the feature vectors to an HMM. Alternatively, the processor may use any other suitable algorithm known in the art, such as any suitable algorithm described in Sakran, Alaa Ehab, et al., "A review: Automatic speech segmentation," International Journal of Computer Science and Mobile Computing 6.4 (2017): 308-315, whose disclosure is incorporated herein by reference.

Optionally, in both first segmenting step 46 and second segmenting step 48, the processor may label the segments as corresponding to respective speech units. These labels may be used in the subsequent mapping and/or distance calculation, as described below.

As described above, the verbal content of the two speech samples is typically at least similar, if not identical. Hence, for embodiments in which the reference-sample segments are labeled, the processor, in executing second segmenting step 48, may divide the test speech sample while constraining the test-sample speech units responsively to the reference-sample speech units. In particular, the processor may bias the segmentation algorithm such that the sequence of test-sample speech units returned by the segmentation algorithm is allowed to differ only slightly from the sequence of reference-sample speech units. Thus, advantageously, the segmentation may leverage prior knowledge of the verbal content of the test-sample speech.

For example, the processor may allow the two sequences to differ from one another only with respect to speech units that are commonly skipped or substituted. As a specific example, the word "a" is pronounced sometimes as /æ/ and at other times as /eI/. Hence, if the word "a" in the reference sample is labeled with the phoneme /æ/, the processor may allow the phoneme /æ/ or /eI/, but not any other phoneme, at the same location in the test-sample speech units.

Alternatively or additionally to constraining the test-sample speech units, the processor, in performing second segmentation step 48, may constrain the segmentation algorithm to output a predetermined number N of segments, N being the number of reference-sample segments. In some embodiments, the processor applies this constraint in response to verifying that the verbal content of the test sample is identical to the verbal content of the reference sample.

Subsequently to second segmenting step 48, the processor, at an optional feature-vector computing step 50a, computes respective reference-sample feature vectors quantifying acoustic features of the reference-sample segments, and respective test-sample feature vectors quantifying the (same) acoustic features of the test-sample segments. (In general, feature-vector computing step 50a is performed if the feature vectors are to be used in the subsequent mapping step 52.) For each of the segments, the feature vector may include acoustic features such as a representation of the spectral envelope of the segment, including, for example, linear prediction coefficients and/or cepstral coefficients (e.g., MFCCs). Alternatively or additionally, for example, the feature vector may include the duration (i.e., length) of the segment, the speech-unit label with which the segment was labeled, and/or a total duration of non-speech sound (e.g., breathing pauses or coughs) prior to the segment.

Next, the processor, at a mapping step 52, maps at least some of the test-sample segments to corresponding ones of the reference-sample segments.

In particular, for embodiments in which the segmentation algorithm was constrained to output N segments, the processor simply maps an $i^{th}$ one of the test-sample segments to an $i^{th}$ one of the reference-sample segments for i=1 . . . N.

For other embodiments, the processor performs the mapping by minimizing a function under one or more predefined constraints, as described above.

An example of a predefined constraint for the mapping is monotonicity. In other words, if the mapping is represented by the notation $\{(t_1,r_1), \ldots, (t_N,r_N)\}$, where each index $t_i$ is the index of a test-sample segment or is null (indicating a skipped speech unit, i.e., a reference sample segment that is not matched by any test sample segment) and each index $r_i$ is the index of a reference-sample segment or is null (indicating an added speech unit, i.e., a test sample segment that is not matched by any reference sample segment), the constraint may require that, excluding any null indices, $t_1 \ldots t_N$ and $r_1 \ldots r_N$ are strictly increasing.

Next, at another optional feature-vector computing step 50b, the processor computes respective test-sample feature vectors quantifying acoustic features of the mapped test-sample segments, and respective reference-sample feature vectors quantifying the (same) acoustic features of the corresponding reference-sample segments to which these test-sample segments were mapped. Features that may be computed at feature-vector computing step 50b include the features described above for feature-vector computing step 50a, though it is noted that the feature vectors computed at feature-vector computing step 50b may be different from those computed at feature-vector computing step 50a. In general, feature-vector computing step 50b is performed if (i) the feature vectors are to be used in the subsequent local-distance computing step 54, and (ii) the feature vectors were not already computed at feature-vector computing step 50a.

At each of the feature-vector computing steps, some features may be computed relative to one or more other segments. Such features may include, for example, the ratio of the energy, mean energy, or duration of the segment to the energy, mean energy, or duration of the previous segment or of the sample. Alternatively or additionally, such features may include the difference between the pitch of the segment and the pitch of the previous segment or the average pitch of the sample.

Subsequently to feature-vector computing step 50b, at a distance-computing step 56, the processor computes the distance between the two speech samples based on respective local distances between the pairs of corresponding segments. For example, the processor may compute the distance between the two speech samples as the sum, root-mean-square, or median of the local distances. Optionally, the local distances may be differentially weighted, e.g., so as to give greater weight to those speech units that are known to be more indicative of the subject's physiological state.

In some embodiments, the processor uses, for the local distances, the measures of dissimilarity that were used in mapping step 52. In other embodiments, the processor, at local-distance computing step 54 (which precedes distance-computing step 56), computes local distances that are different from these measures of dissimilarity.

For example, the processor may perform mapping step 52 by minimizing a total measure of dissimilarity between the test-sample speech units and the corresponding reference-sample speech units, but compute the local distances between pairs of corresponding feature vectors, which were computed at feature-vector computing step 50b.

Alternatively, the processor may base the local distances on the same parameters as those on which the measures of dissimilarity were based, but compute the local distances differently from the measures of dissimilarity, e.g., so as to give greater weight to features or speech units known to be more indicative of the subject's physiological state.

As another example, the processor may compute the local distances by differentially weighting the measures of dissimilarity, e.g., so as to give greater weight to those speech units known to be more indicative of the subject's physiological state.

Finally, at a communicating step 58, the processor communicates an output in response to the distance.

Figure 4:
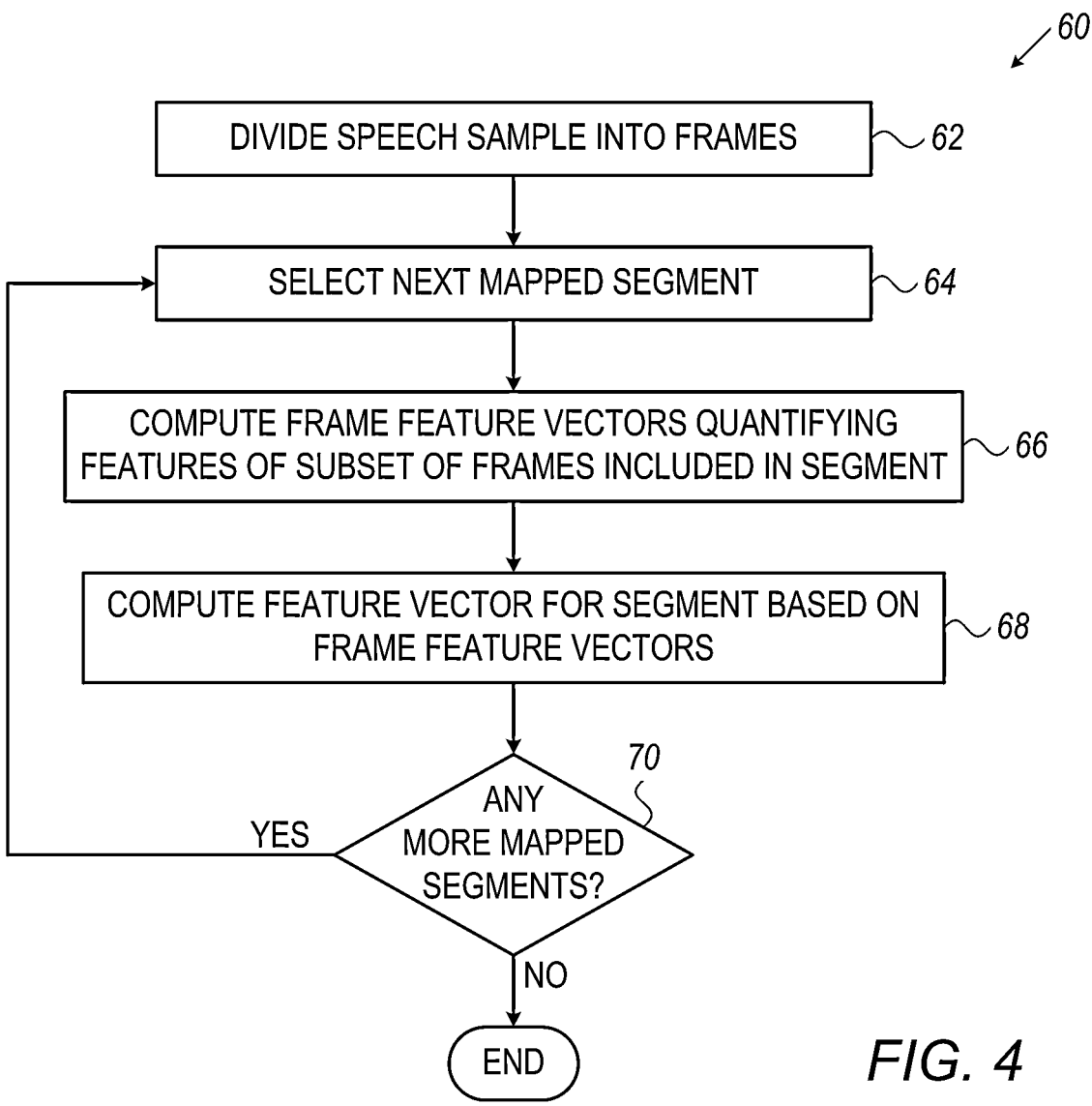
FIG. 4 is a flow diagram for a method for computing feature vectors, in accordance with some embodiments of the present invention.

Reference is now further made to FIG. 4, which is a flow diagram for a method 60 for computing feature vectors, in accordance with some embodiments of the present invention. The processor may execute method 60 in the performance of one or both of feature-vector computing steps 50a and 50b, for both the reference sample and the test sample.

Method 60 begins with a dividing step 62, at which the speech sample is divided into multiple frames. (Dividing step 62 may be omitted if the sample was previously divided into frames at first segmenting step 46 or second segmenting step 48.) Each of the segments of the speech sample thus includes a different respective subset of the frames.

Following dividing step 62, the processor iterates through the mapped segments, i.e., the segments that are mapped to the segments of the other speech sample. Each mapped segment is selected at a segment-selecting step 64. Following the selection, the processor, at a frame-feature-vector computing step 66, computes multiple frame feature vectors quantifying the features of the subset of the frames included in the segment. (Alternatively, the processor may compute the frame feature vectors for the entire speech sample prior to or following dividing step 62, and then select the feature vectors for the subset of frames following segment-selecting step 64.) Subsequently, at a segment-feature-vector computing step 68, the processor computes a feature vector for the segment based on the frame feature vectors.

In some embodiments, even if feature vectors were previously calculated for the frames at first segmenting step 46 or second segmenting step 48, the processor computes different feature vectors at frame-feature-vector computing step 66. In other embodiments, the previously-calculated feature vectors are used, and frame-feature-vector computing step 66 is omitted.

In some embodiments, at segment-feature-vector computing step 68, the feature vector is computed for the segment based on a statistic, such as the average, of the feature vectors for the frames of the segment.

In other embodiments, the processor fits respective functions to one or more components of the frame feature vectors. Subsequently, the processor computes the feature vector for the segment based on parameters of the functions. For example, the processor may fit the functions using linear or polynomial regression, and then compute the feature vector based on the regression coefficients. Alternatively, the processor may fit the function by computing a transform, such as a Fourier transform or a discrete cosine transform (DCT), of the components of the frame feature vectors, and then compute the feature vector for the segment based on one or more coefficients of the transform.

In yet other embodiments, the processor, at segment-feature-vector computing step 68, computes multiple feature vectors corresponding to different respective stages of the segment. Subsequently, at mapping step 52 (FIG. 3), the segment is mapped to multiple reference-sample segments based on the multiple feature vectors.

For example, the processor may compute multiple feature vectors for the segment by computing multiple different weighted averages of the frame feature vectors. For example, the processor may compute three feature vectors for a segment representing an APU: one for the beginning ("transition in") of the segment, another for the middle of the segment, and another for the end ("transition out") of the segment. The beginning feature vector may be computed by giving greater weight to the beginning frames, the middle feature vector by giving greater weight to the middle frames, and the end feature vector by giving greater weight to the end frames.

It is noted that in addition to the features derived from the frame feature vectors, the feature vector(s) computed at segment-feature-vector computing step 68 may include other features, such as any of the other features described above (e.g., the duration of the segment or a ratio of energies).

Following segment-feature-vector computing step 68, the processor checks, at a checking step 70, whether any mapped segments remain. If yes, the processor returns to segment-selecting step 64. Otherwise, method 60 ends.

In other embodiments, feature-vector computing steps 50a and 50b are performed even without first dividing the sample into frames as in method 60.

(ii) Segment-Based Mapping to a Speech Model

In some embodiments, after segmenting the test speech sample based on the acoustic properties thereof, the processor maps at least some of the test-sample segments to corresponding acoustic states of a speech model.

In some embodiments, the speech model allows only a single sequence of acoustic states. In other words, the speech model specifies the allowed transitions or transition probabilities such that a particular sequence has a probability of one, and any other sequence has a probability of zero. Typically, the allowed sequence corresponds to a particular utterance uttered with the subject's pronunciation (i.e., accounting for any phonetic variations in the subject's speech).

In such embodiments, the subject may be instructed to produce, for the test speech sample, the utterance to which the allowed sequence corresponds. Optionally, the processor may then verify that the subject produced the same utterance, as described above with reference to second segmenting step 48 (FIG. 3). (In other words, the processor may verify that the test speech sample includes the verbal content to which the allowed sequence corresponds.) Subsequently, the processor may segment the speech sample based on the feature vectors of the frames of the speech sample, as described above for second segmenting step 48, with a constraint that the number of segments equal the number N of acoustic states in the allowed sequence specified by the speech model. Subsequently, the processor may map the $i^{th}$ segment to the $i^{th}$ acoustic state in the sequence for i=1 . . . N.

In other embodiments, the processor does not constrain the number of test-sample segments. Rather, after segmenting the test sample without such a constraint, the processor finds a mapping that minimizes a particular function.

For example, in some embodiments, the acoustic states correspond to different respective speech units, referred to hereinbelow, for convenience, as "speech-model speech units." In other words, each of the acoustic states is associated with a label, from a predefined set of labels, characterizing the acoustic properties of the speech unit to which the acoustic state corresponds. (It is noted that each of the labels may be an arbitrarily-assigned identifier, such as a serial number, corresponding to a respective speech unit.)

In such embodiments, the processor divides the test-speech sample into segments such that the test-sample segments are labeled as corresponding to respective speech units, referred to hereinbelow as "test-sample speech units," the labels being taken from the same predefined set of labels used for the acoustic states of the speech model. Subsequently, based on the allowed transitions specified by the model, the processor finds the correspondence between the test-sample segments and the acoustic states of the model that minimizes, under one or more predefined constraints, a function based on a dissimilarity between the test-sample speech units of the mapped test-sample segments and the speech-model speech units of the corresponding acoustic states.

More particularly, for some speech models, such as HMMs, the function may be based on respective measures of dissimilarity between the mapped test-sample speech units and the corresponding speech-model speech units. For other speech models, such as DNN-based models, there may not be an explicit measure of dissimilarity computed for each pair of corresponding speech units, but rather, only an overall measure of dissimilarity between the two sequences of speech units.

In general, the measures of dissimilarity may be defined, and insertions and deletions may be modeled, as described above for the mapping to a reference speech sample.

In some such embodiments, the processor, while dividing the test speech sample, constrains the test-sample speech units responsively to the allowed transitions and, optionally, the probabilities of these transitions as specified by the model. In other words, the processor biases the segmentation so as to favor allowed sequences of test-sample speech units and in particular, in some embodiments, those allowed sequences having greater a priori probability.

Alternatively or additionally, the processor may allow the sequence of test-sample segments to differ from an allowed sequence of acoustic states only with respect to speech units that are commonly skipped or substituted, as described above for the mapping to a reference speech sample.

Alternatively to biasing the segmentation, the processor may, subsequently to dividing the test speech sample and prior to the mapping, modify the sequence of test-sample segments responsively to the allowed transitions and, optionally, the probabilities of these transitions. In performing this modification, the processor may change the labels of one or more segments, delete one or more segments and their corresponding labels from the sequence, and/or insert one or more null segments with selected labels into the sequence. The processor may thus favor allowed sequences of test-sample speech units and in particular, in some embodiments, those allowed sequences having greater a priori probability.

Typically, the modification of the sequence is performed, via an exhaustive search or any suitable optimization algorithm, so as to minimize a particular cost function.

Typically, the cost function is based on a measure of dissimilarity between the sequence prior to the modification and the sequence subsequent to the modification. This measure of dissimilarity may be computed, for example, as described above with reference to the mapping of the test sample to the reference sample. (In effect, the modification of the sequence of test-sample segments may be viewed as a mapping between each speech unit in the modified sequence and a corresponding speech unit in the original "reference" sequence.) For embodiments in which the speech model specifies respective probabilities for the allowed transitions, the cost function may be based, additionally, on the probability of the modified sequence as derived from the specified probabilities. In other words, the processor may compute the modified sequence based on the similarity of the modified sequence to the original sequence and also the probability of the modified sequence. (Thus, the processor may select a higher-probability sequence over a lower-probability sequence, even though the latter is more similar to the original sequence than is the former.) For example, letting D denote the measure of dissimilarity between the original sequence and the modified sequence, and letting P denote the probability of the modified sequence, the processor may compute the modified sequence so as to minimize the cost function D−K*log(P), where K is a suitable weighting factor.

Alternatively, instead of performing the modification before the mapping, the processor may perform the modification, concurrently with the mapping, so as to minimize a cost function based on the local distances between the mapped test-sample segments and the corresponding acoustic states. Optionally, the cost function may also be based on a measure of dissimilarity between the sequence prior to the modification and the sequence subsequent to the modification. For example, the cost function minimized in the mapping may be based on a sum (e.g., a weighted sum) of (i) a measure of dissimilarity between the modified sequence of test-sample segments and the original sequence, and (ii) another distance measure based on the local distances.

In other embodiments, the processor computes the mapping based on feature vectors of the segments, rather than the speech-unit labels of the segments. In other words, the processor computes respective test-sample feature vectors quantifying acoustic features of the test-sample segments. Subsequently, the processor finds the correspondence between the test-sample segments and the acoustic states that minimizes, under one or more predefined constraints, a function of respective measures of dissimilarity between the test-sample feature vectors of the mapped test-sample segments and the corresponding acoustic states. To compute these measures of dissimilarity, the processor may input the test-sample feature vector of each mapped test-sample segment to the local distance function of the acoustic state to which the segment is mapped.

In general, the feature vector(s) for each test-sample segment may be computed as described above with reference to FIG. 4.

In yet other embodiments, the processor finds the correspondence that minimizes a function of both (i) respective measures of dissimilarity between the test-sample speech units of the mapped test-sample segments and the speech-model speech units of the corresponding acoustic states, and (ii) respective measures of dissimilarity between the test-sample feature vectors of the mapped test-sample segments and the corresponding acoustic states. For example, the function may be based on a weighted sum of the total speech-unit dissimilarity measure and the total feature-vector dissimilarity measure.

For embodiments in which the speech model specifies respective probabilities for the allowed transitions, the minimized function may be based on the probability of the sequence of corresponding acoustic states as derived from the specified probabilities. In other words, the processor may bias the mapping so as to favor sequences of acoustic states having greater a priori probability.

Subsequently to performing the mapping, the processor generates an output, which is indicative of the subject's physiological state, based on a distance between the test sample and the speech model per the mapping. In some embodiments, this distance is the value of the function minimized during the mapping; in other embodiments, after performing the mapping, the processor calculates a separate distance.

In some embodiments, the aforementioned distance is based on respective local distances between the mapped test-sample segments and the corresponding acoustic states. For example, the distance may be based on the sum (e.g., a weighted sum) of the local distances. In general, each local distance may be based on (i) a measure of dissimilarity between the test-sample speech unit of the segment and the speech-model speech unit of the acoustic state, (ii) a measure of dissimilarity between the feature vector of the segment and the acoustic state, or (iii) a combination of the two. For a null segment, the local distance may be set to a predefined fixed value.

(As noted above, in other embodiments, particularly those in which a DNN architecture is used, local distances are not explicitly computed. Rather, the speech model simply returns the distance minimized during the mapping.)

For embodiments in which the sequence of test-sample segments is modified prior to the mapping as described above, the distance between the test sample and the model may be based on the cost function minimized during this modification. For example, the distance may be a function of (i) the sum of the local distances, and (ii) the value of the minimized cost function, which, as described above, may be based on the similarity of the modified sequence to the original sequence. For example, the distance may be the sum of (i) and (ii), the sum of the logs of (i) and (ii), or the sum of the squares of (i) and (ii).

Figure 7:
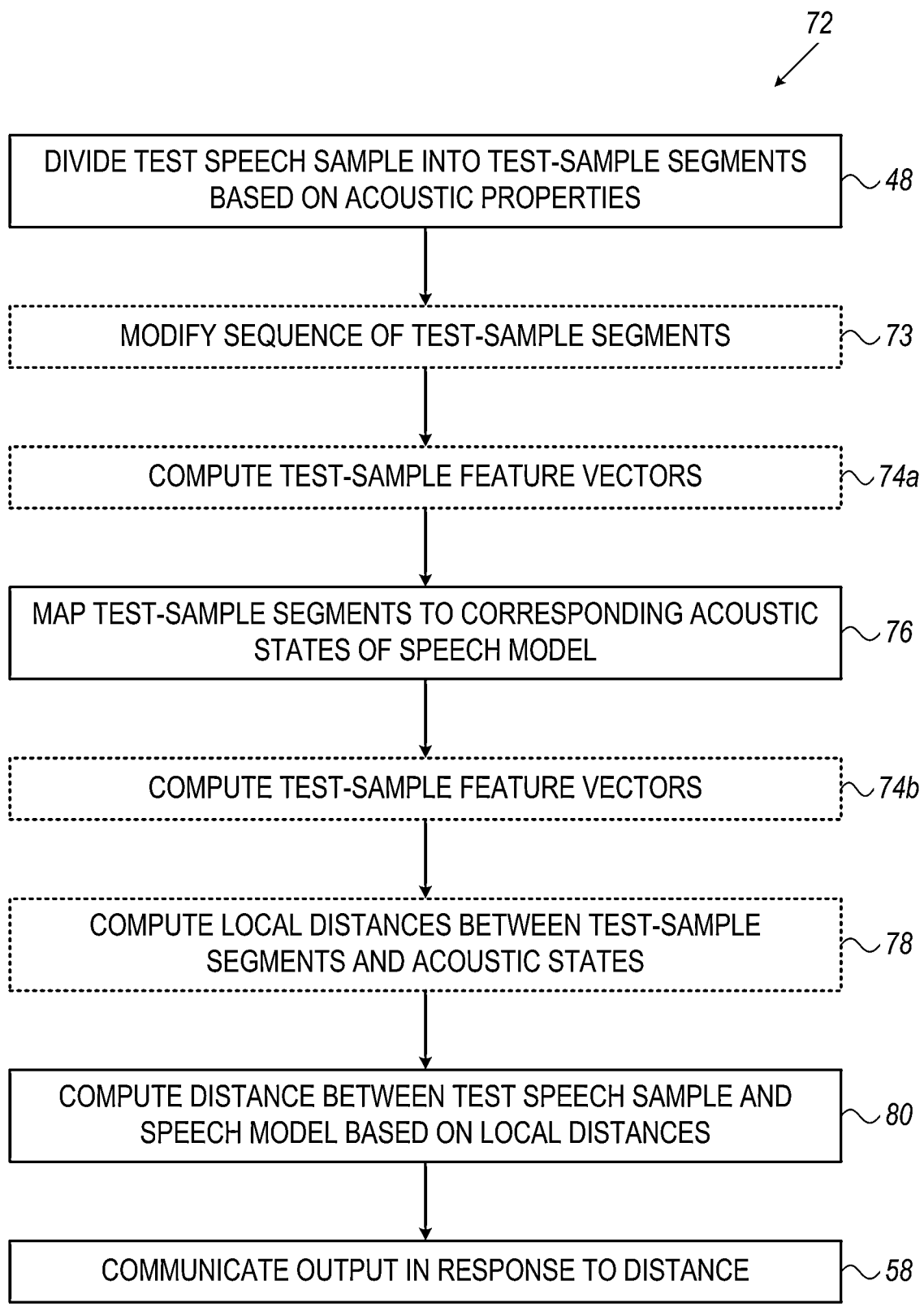
FIG. 7 is a flow diagram for a method for comparing a test speech sample to a speech model, in accordance with some embodiments of the present invention.

For further details, reference is now made to FIG. 7, which is a flow diagram for a method 72 for comparing a test speech sample to a speech model, in accordance with some embodiments of the present invention.

Method 72 begins with second segmenting step 48, at which the processor divides the test speech sample into multiple test-sample segments based on differences in acoustic properties between each pair of successive ones of the test-sample segments. Optionally, the processor may label the segments as corresponding to respective speech units. These labels may be used in the subsequent mapping and/or distance calculation, as described below.

As described above, the segmentation of the test sample may be constrained responsively to the speech model. For example, if the speech model allows a single sequence of acoustic states, the number of test-sample segments may be constrained to match the number of acoustic states (including repetitions) in the allowed sequence. Alternatively, for example, the sequence of test-sample segments may be constrained such that only allowed transitions are included, or such that more probable sequences are given preference.

Alternatively, subsequently to second segmenting step 48, the processor, at an optional sequence-modifying step 73, may modify the sequence of test-sample segments responsively to the allowed transitions. Optionally, as described above, the modification may be performed so as to minimize a cost function, which may be based on the similarity between the modified sequence and the original sequence and/or the probability of the modified sequence.

Next, at an optional feature-vector computing step 74a, the processor computes respective test-sample feature vectors quantifying the acoustic features of the test-sample segments. (In general, feature-vector computing step 74a is performed if the feature vectors are to be used in the subsequent mapping step 76.) The feature vectors may include features such as those described above with reference to feature-vector computing step 50a (FIG. 3).

Next, the processor, at mapping step 76, maps at least some of the test-sample segments to corresponding acoustic states of the speech model.

In particular, for embodiments in which the segmentation algorithm was constrained to output N segments, N being the number of acoustic states (including repetitions) in the single allowed sequence of acoustic states, the processor simply maps an $i^{th}$ one of the test-sample segments to an $i^{th}$ one of the acoustic states in the allowed sequence for i=1 . . . N.

For other embodiments, the processor performs the mapping by minimizing a function under one or more predefined constraints, as described above. An example of a predefined constraint for the mapping is monotonicity, which is based on the allowed transitions specified by the speech model. Optionally, a single segment may be mapped to multiple acoustic states based on multiple feature vectors computed for the segment, as described above with reference to FIG. 4.

Next, at another optional feature-vector computing step 74b, the processor computes respective test-sample feature vectors quantifying acoustic features of the mapped test-sample segments. Features that may be computed at feature-vector computing step 74b include the features described above for feature-vector computing step 74a, though it is noted that the feature vectors computed at feature-vector computing step 74b may be different from those computed at feature-vector computing step 74a. In general, feature-vector computing step 74b is performed if (i) the feature vectors are to be used in the subsequent local-distance computing step 78, and (ii) the feature vectors were not already computed at feature-vector computing step 74a.

At each of the feature-vector computing steps, some features may be computed relative to one or more other segments, as described above with reference to FIG. 3.

Subsequently to feature-vector computing step 74*b*, at a distance-computing step 80, the processor computes the distance between the test speech sample and the speech model, based on respective local distances between the mapped test-sample segments and the corresponding acoustic states. For example, the processor may compute the distance as the sum, root-mean-square, or median of the local distances. Optionally, the local distances may be differentially weighted, e.g., so as to give greater weight to those speech units that are known to be more indicative of the subject's physiological state.

In some embodiments, the processor uses, for the local distances, the measures of dissimilarity used in mapping step 76. In other embodiments, the processor, at local-distance computing step 78 (which precedes distance-computing step 80), computes local distances that are different from the measures of dissimilarity. For example, the processor may perform mapping step 76 by minimizing a total measure of dissimilarity between the test-sample speech units and the corresponding speech-model speech units, but compute the local distances by inputting the feature vectors of the mapped test-sample segments to the local distance functions of the corresponding acoustic states. Alternatively, the processor may base the local distances on the same parameters as those on which the measures of dissimilarity were based, but compute the local distances differently, or differentially weight the measures of dissimilarity, as described above with reference to FIG. 3.

(Alternatively, as noted above, the processor may simply base the final output on the distance minimized during the mapping, without performing any subsequent calculations.)

Finally, the processor executes communicating step 58, as described above with reference to FIG. 3.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
an output interface; and
one or more processors, configured to cooperatively carry out a process that includes:
mapping a test speech sample, which was produced by a subject while a physiological state of the subject was unknown, to a reference speech sample, which was produced in a known physiological state,
based on the mapping, computing a distance between the test speech sample and the reference speech sample, and
in response to the distance, communicating, via the output interface, an output indicating the physiological state of the subject while the test speech sample was produced,
wherein the reference speech sample was divided into multiple reference-sample segments based on differences in acoustic properties between each pair of successive ones of the reference-sample segments,
wherein mapping the test speech sample to the reference speech sample includes:
dividing the test speech sample into multiple test-sample segments based on differences in the acoustic properties between each pair of successive ones of the test-sample segments, and
mapping at least some of the test-sample segments to corresponding ones of the reference-sample segments, and
wherein computing the distance includes computing the distance based on respective local distances between the mapped test-sample segments and the corresponding ones of the reference-sample segments.

2. A method, comprising:
mapping, by a processor, a test speech sample, which was produced by a subject while a physiological state of the subject was unknown, to a reference speech sample, which was produced in a known physiological state;
based on the mapping, computing a distance between the test speech sample and the reference speech sample; and
in response to the distance, communicating an output indicating the physiological state of the subject while the test speech sample was produced,
wherein the reference speech sample was divided into multiple reference-sample segments based on differences in acoustic properties between each pair of successive ones of the reference-sample segments,
wherein mapping the test speech sample to the reference speech sample comprises:
dividing the test speech sample into multiple test-sample segments based on differences in the acoustic properties between each pair of successive ones of the test-sample segments; and
mapping at least some of the test-sample segments to corresponding ones of the reference-sample segments, and
wherein computing the distance comprises computing the distance based on respective local distances between the mapped test-sample segments and the corresponding ones of the reference-sample segments.

3. The method according to claim 2, further comprising, prior to the mapping, verifying that the test speech sample and reference speech sample include the same verbal content.

4. The system according to claim 1,
wherein the reference-sample segments were labeled as corresponding to respective reference-sample speech units, and
wherein dividing the test-speech sample includes dividing the test-speech sample such that the test-sample segments are labeled as corresponding to respective test-sample speech units.

5. The system according to claim 1, wherein the process further includes:
computing respective test-sample feature vectors quantifying acoustic features of the mapped test-sample segments,
computing respective reference-sample feature vectors quantifying the acoustic features of the corresponding ones of the reference-sample segments, and
computing the local distances by computing the local distances between the test-sample feature vectors and the reference-sample feature vectors, respectively.

6. The method according to claim 2, wherein the reference speech sample was produced by the subject.

7. The method according to claim 2,
wherein the reference speech sample was divided into N reference-sample segments,
wherein dividing the test speech sample comprises dividing the test speech sample into N test-sample segments, and
wherein mapping the at least some of the test-sample segments to the corresponding ones of the reference-sample segments comprises mapping an $i^{th}$ one of the test-sample segments to an $i^{th}$ one of the reference-sample segments for i=1 ... N.

8. The method according to claim 2,
wherein the reference-sample segments were labeled as corresponding to respective reference-sample speech units, and
wherein dividing the test-speech sample comprises dividing the test-speech sample such that the test-sample segments are labeled as corresponding to respective test-sample speech units.

9. The method according to claim 8, wherein mapping the at least some of the test-sample segments to the corresponding ones of the reference-sample segments comprises mapping the at least some of the test-sample segments to the corresponding ones of the reference-sample segments by finding the correspondence that minimizes, under one or more predefined constraints, a function of respective measures of dissimilarity between the test-sample speech units of the mapped test-sample segments and the reference-sample speech units of the corresponding ones of the reference-sample segments.

10. The method according to claim 8, wherein dividing the test speech sample comprises dividing the test speech sample while constraining the test-sample speech units responsively to the reference-sample speech units.

11. The method according to claim 2, further comprising:
computing respective test-sample feature vectors quantifying acoustic features of the test-sample segments; and
computing respective reference-sample feature vectors quantifying the acoustic features of the reference-sample segments,
wherein mapping the at least some of the test-sample segments to the corresponding ones of the reference-sample segments comprises mapping the at least some of the test-sample segments to the corresponding ones of the reference-sample segments by finding the correspondence that minimizes, under one or more predefined constraints, a function of respective measures of dissimilarity between the test-sample feature vectors of the mapped test-sample segments and the reference-sample feature vectors of the corresponding ones of the reference-sample segments.

12. The method according to claim 2, further comprising:
computing respective test-sample feature vectors quantifying acoustic features of the mapped test-sample segments;
computing respective reference-sample feature vectors quantifying the acoustic features of the corresponding ones of the reference-sample segments; and
computing the local distances by computing the local distances between the test-sample feature vectors and the reference-sample feature vectors, respectively.

13. The method according to claim 12, wherein computing the test-sample feature vectors comprises:
dividing the test speech sample into multiple frames, such that each of the test-sample segments includes a different respective subset of the frames; and
for each of the mapped test-sample segments:
computing multiple test-frame feature vectors quantifying the acoustic features of the subset of the frames included in the test-sample segment, and
computing the test-sample feature vector for the test-sample segment based on the test-frame feature vectors.

14. The method according to claim 13, wherein computing the test-sample feature vector for the test-sample segment comprises computing the test-sample feature vector for the test-sample segment based on a statistic of the test-frame feature vectors.

15. The method according to claim 13, wherein computing the test-sample feature vector for the test-sample segment comprises:
fitting respective functions to one or more components of the test-frame feature vectors; and
computing the test-sample feature vector for the test-sample segment based on parameters of the functions.

16. A computer software product comprising a tangible non-transitory computer-readable medium in which program instructions are stored, which instructions, when read by a processor, cause the processor to:
map a test speech sample, which was produced by a subject while a physiological state of the subject was unknown, to a reference speech sample, which was produced in a known physiological state,
based on the mapping, compute a distance between the test speech sample and the reference speech sample, and
in response to the distance, communicate an output indicating the physiological state of the subject while the test speech sample was produced,
wherein the reference speech sample was divided into multiple reference-sample segments based on differences in acoustic properties between each pair of successive ones of the reference-sample segments,
wherein the instructions cause the processor to map the test speech sample to the reference speech sample by:
dividing the test speech sample into multiple test-sample segments based on differences in the acoustic properties between each pair of successive ones of the test-sample segments, and
mapping at least some of the test-sample segments to corresponding ones of the reference-sample segments, and
wherein the instructions cause the processor to compute the distance based on respective local distances between the mapped test-sample segments and the corresponding ones of the reference-sample segments.

17. The computer software product according to claim 16, wherein the reference speech sample was produced by the subject.

18. The computer software product according to claim 16, wherein the instructions further cause the processor to verify, prior to the mapping, that the test speech sample and reference speech sample include the same verbal content.

19. The computer software product according to claim 16,
wherein the reference speech sample was divided into N reference-sample segments,
wherein the instructions cause the processor to divide the test speech sample into N test-sample segments, and
wherein the instructions cause the processor to map the at least some of the test-sample segments to the corresponding ones of the reference-sample segments by mapping an $i^{th}$ one of the test-sample segments to an $i^{th}$ one of the reference-sample segments for i=1 . . . N.

20. The computer software product according to claim 16, wherein the reference-sample segments were labeled as corresponding to respective reference-sample speech units, and wherein the instructions cause the processor to divide the test-speech sample such that the test-sample segments are labeled as corresponding to respective test-sample speech units.

21. The computer software product according to claim 20, wherein the instructions cause the processor to map the at least some of the test-sample segments to the corresponding ones of the reference-sample segments by finding the correspondence that minimizes, under one or more predefined constraints, a function of respective measures of dissimilarity between the test-sample speech units of the mapped test-sample segments and the reference-sample speech units of the corresponding ones of the reference-sample segments.

22. The computer software product according to claim 20, wherein the instructions cause the processor to divide the test speech sample while constraining the test-sample speech units responsively to the reference-sample speech units.

23. The computer software product according to claim 16, wherein the instructions further cause the processor to:
    compute respective test-sample feature vectors quantifying acoustic features of the test-sample segments, and
    compute respective reference-sample feature vectors quantifying the acoustic features of the reference-sample segments, and
    wherein the instructions cause the processor to map the at least some of the test-sample segments to the corresponding ones of the reference-sample segments by finding the correspondence that minimizes, under one or more predefined constraints, a function of respective measures of dissimilarity between the test-sample feature vectors of the mapped test-sample segments and the reference-sample feature vectors of the corresponding ones of the reference-sample segments.

24. The computer software product according to claim 16, wherein the instructions further cause the processor to:
    compute respective test-sample feature vectors quantifying acoustic features of the mapped test-sample segments,
    compute respective reference-sample feature vectors quantifying the acoustic features of the corresponding ones of the reference-sample segments, and
    compute the local distances by computing the local distances between the test-sample feature vectors and the reference-sample feature vectors, respectively.

25. The computer software product according to claim 24, wherein the instructions cause the processor to compute the test-sample feature vectors by:
    dividing the test speech sample into multiple frames, such that each of the test-sample segments includes a different respective subset of the frames, and
    for each of the mapped test-sample segments:
        computing multiple test-frame feature vectors quantifying the acoustic features of the subset of the frames included in the test-sample segment, and
        computing the test-sample feature vector for the test-sample segment based on the test-frame feature vectors.

\* \* \* \* \*